United States Patent
Bik et al.

(10) Patent No.: US 7,020,873 B2
(45) Date of Patent: Mar. 28, 2006

(54) APPARATUS AND METHOD FOR VECTORIZATION OF DETECTED SATURATION AND CLIPPING OPERATIONS IN SERIAL CODE LOOPS OF A SOURCE PROGRAM

(75) Inventors: Aart J. C. Bik, Union City, CA (US); Milind Girkar, Sunnyvale, CA (US)

(73) Assignee: Intel Corporation, Santa Clara, CA (US)

( * ) Notice: Subject to any disclaimer, the term of this patent is extended or adjusted under 35 U.S.C. 154(b) by 576 days.

(21) Appl. No.: 10/176,503

(22) Filed: Jun. 21, 2002

(65) Prior Publication Data

US 2004/0001066 A1  Jan. 1, 2004

(51) Int. Cl.
*G06F 9/45* (2006.01)

(52) U.S. Cl. ...................................................... 717/156

(58) Field of Classification Search ................ 717/156; 708/204
See application file for complete search history.

(56) References Cited

U.S. PATENT DOCUMENTS 5,121,498 A * 6/1992 Gilbert et al. ............... 717/149
6,502,115 B1 * 12/2002 Abdallah et al. ........... 708/204

* cited by examiner

*Primary Examiner*—John Chavis
(74) *Attorney, Agent, or Firm*—Blakely, Sokoloff, Taylor & Zafman LLP

(57) ABSTRACT

An apparatus and method for vectorization of detected saturation and clipping operations in serial code loops of a source program are described. In one embodiment, the method includes the analysis of source program code to identify source code utilizing conditional constructs to perform saturation/clipping operations. Once analysis is complete, identified source code is vectorized to implement identified saturation/clipping operations utilizing single instruction, multiple data (SIMD) saturation/clipping instructions. Accordingly, utilizing embodiments of the present invention, conditional statements utilized to implement saturation arithmetic, as well as clipping of data values, such as pixel values within graphics applications, are replaced with SIMD saturation arithmetic instructions, as well as clipping instructions.

30 Claims, 16 Drawing Sheets

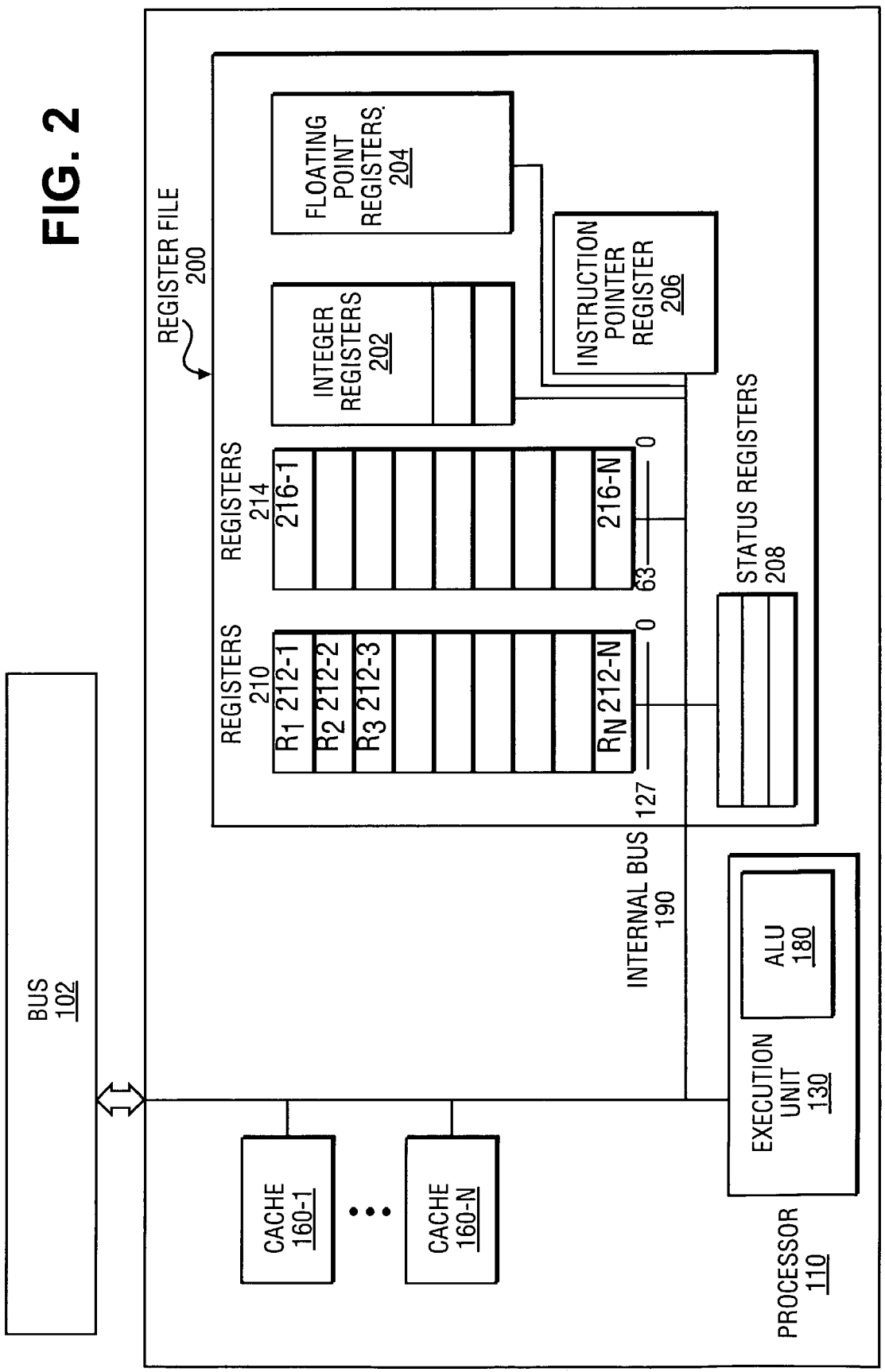

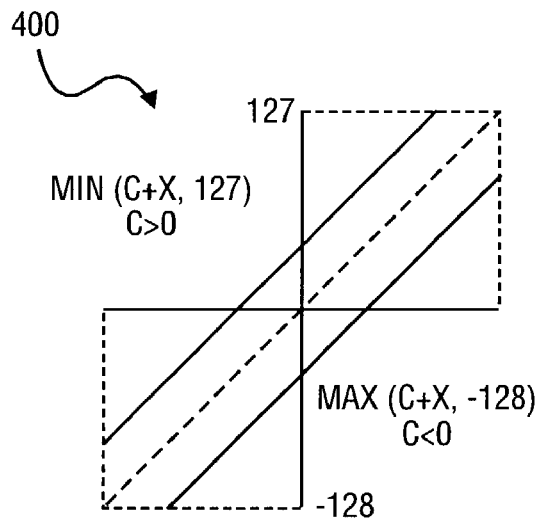
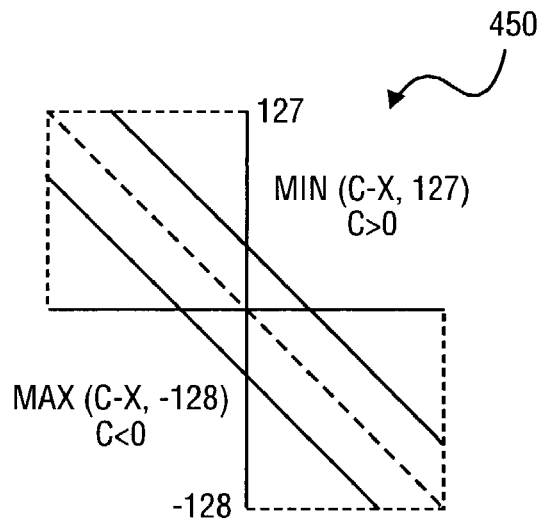
FIG. 4A  FIG. 4B
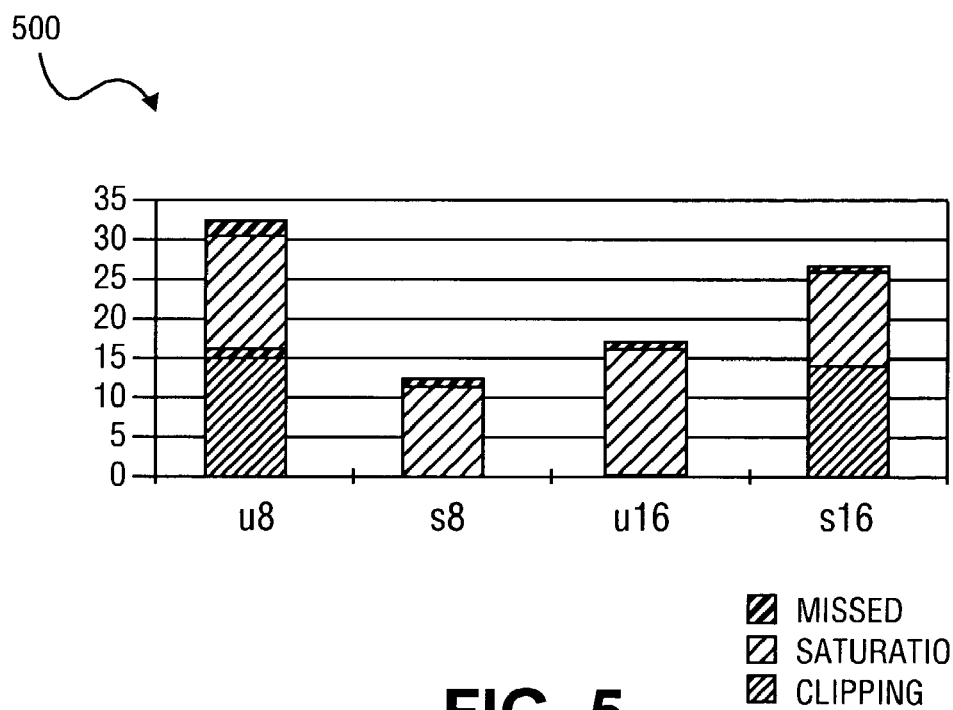
FIG. 5

APPARATUS AND METHOD FOR VECTORIZATION OF DETECTED SATURATION AND CLIPPING OPERATIONS IN SERIAL CODE LOOPS OF A SOURCE PROGRAM

FIELD OF THE INVENTION

One or more embodiments of the invention relate generally to the field of computer graphics. More particularly, one embodiment of the invention relates to a method and apparatus for vectorization of detected saturation and clipping operations in serial code loops of a source program.

BACKGROUND OF THE INVENTION

Computer designers are faced with the task of designing systems that must meet continually expanding performance requirements. At an architectural level, many advances either reduce latency (the time between start and completion of an operation), or increase bandwidth (the width and rate of operations). At the semiconductor level, the speed of circuits has increased, while packaging densities have been enhanced to obtain higher performance. However, due to physical limitations on the speed of electronic components, other performance enhancing approaches have also been taken. In fact, a current architectural advance, which provides significant performance improvement in execution bandwidth, was first conceived during the early days of supercomputing.

The early days of supercomputing realized an architectural advantage by utilizing data parallelism to design legacy vector architectures with improved execution bandwidth. This form of parallelism arises in many numerical applications in science, engineering and image processing, where a single operation is applied to multiple elements in the data set ("data parallelism"), usually a vector or matrix. One way to utilize data parallelism that has proven effective in early processors is data pipelining. In this approach, vectors of data stream directly from memory or vector registers to and from pipelined functional units of the legacy vector architectures.

However, exploiting data parallelism within current architectures requires the conversion of serial code into parallel instructions to achieve optimum performance. One technique for rewriting serial code into a form that enables simultaneous (or parallel) processing of an instruction on multiple data elements is the single instruction, multiple data (SIMD) technique. Unfortunately, the task of transforming serial code into parallel instructions, such as SIMD instructions, is often a cumbersome task for programmers. As described herein, rewriting of serial code into a form that exploits instruction parallelism provided by, for example, SIMD instructions, is referred to as "vectorization".

As described above, the SIMD technique provides a significant enhancement to execution bandwidth in mainstream computing. According to the SIMD approach, multiple functional units operate simultaneously on so-called "packed data elements" (relatively short vectors that reside in memory or registers). As a result, since a single instruction processes multiple data elements in parallel, this form of instruction level parallelism provides a new way to utilize data parallelism first devised during the early days of supercomputers. Accordingly, recent extensions to computing architectures utilize the SIMD technique to form architectures that support streaming SIMD extension (SSE/SSE2) ("SIMD Extension Architectures"). As a result, SIMD extension architectures enhance the performance of computationally intensive applications by utilizing a single operation which simultaneously processes different elements in a data set.

In addition to serial code vectorization, exploiting data parallelism generally requires the implementation of SIMD clipping instructions, as well as SIMD saturation instructions. In fact, implementing the conditional flow of control that is inherent to clipping and saturation operations without branch instructions is an important performance issue for SIMD Extension microarchitectures. Unfortunately, high level program languages generally do not include instructions or constructs for performing saturation arithmetic, as well as clipping operations.

As known to those skilled in the art, saturation and clipping constructs are commonly used in, for example, graphics applications to avoid anomalies where standard wraparound arithmetic would suddenly make black pixels darker instead of brighter. However, due to the lack of saturation and clipping operations in programming languages like C++ and Fortran, such constructs have to be explicitly coded. The explicit coding is generally performed utilizing "if" statements, or conditional expressions to test the value of operands before the actual arithmetic operations are performed. Therefore, there remains a need to overcome one or more of the limitations in the above-described, existing art.

BRIEF DESCRIPTION OF THE DRAWINGS

The various embodiments of the present invention are illustrated by way of example, and not by way of limitation, in the figures of the accompanying drawings and in which:

FIG. 2 depicts a block diagram illustrating a processor, as depicted in FIG. 1, in accordance with a further embodiment of the present invention.

FIGS. 4A and 4B depict graphs for converting MIN/MAX instructions into signed, single clip operations, in accordance with one embodiment of the present invention.

FIG. 5 depicts a graph illustrating results obtained from processing a benchmark source code program utilizing a system compiler, in accordance with one embodiment of the present invention.

DETAILED DESCRIPTION

Figure 1:
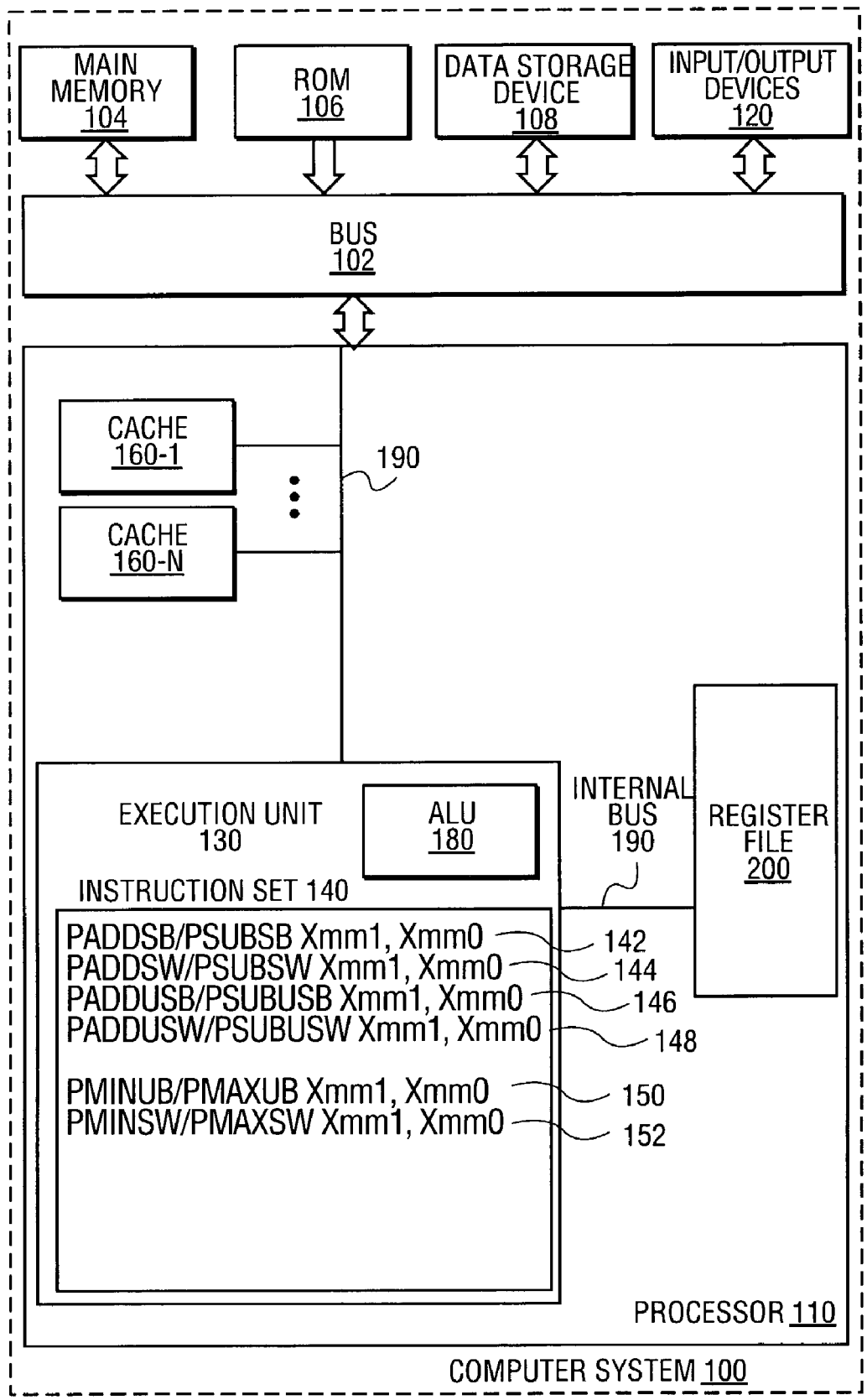
FIG. 1 depicts a block diagram illustrating a computer system implementing a system compiler for vectorizing detected saturation and clipping operations within serial code loops of a source program, in accordance with one embodiment of the present invention.

A method and apparatus for vectorization of detected saturation and clipping operations within serial code loops of a source program are described. In one embodiment, the method includes the analysis of source program code to identify source code utilizing conditional constructs to perform saturation/clipping operations. Once analysis is complete, identified source code is vectorized to implement identified saturation/clipping operations utilizing single instruction, multiple data (SIMD) saturation/clipping instructions. Accordingly, utilizing embodiments of the present invention, conditional statements utilized to implement saturation arithmetic, as well as clipping of data values, such as pixel values within graphics applications, are replaced with SIMD saturation arithmetic instructions, as well as clipping instructions.

In the following description, for the purposes of explanation, numerous specific details are set forth in order to provide a thorough understanding of the embodiments of the present invention. It will be apparent, however, to one skilled in the art that the various embodiments of the present invention may be practiced without some of these specific details. In addition, the following description provides examples, and the accompanying drawings show various examples for the purposes of illustration. However, these examples should not be construed in a limiting sense as they are merely intended to provide examples of the embodiments of the present invention rather than to provide an exhaustive list of all possible implementations of the embodiments of the present invention. In other instances, well-known structures and devices are shown in block diagram form in order to avoid obscuring the details of the various embodiments of the present invention.

Portions of the following detailed description may be presented in terms of algorithms and symbolic representations of operations on data bits. These algorithmic descriptions and representations are used by those skilled in the data processing arts to convey the substance of their work to others skilled in the art. An algorithm, as described herein, refers to a self-consistent sequence of acts leading to a desired result. The acts are those requiring physical manipulations of physical quantities. These quantities may take the form of electrical or magnetic signals capable of being stored, transferred, combined, compared, and otherwise manipulated. Moreover, principally for reasons of common usage, these signals are referred to as bits, values, elements, symbols, characters, terms, numbers, or the like.

However, these and similar terms are to be associated with the appropriate physical quantities and are merely convenient labels applied to these quantities. Unless specifically stated otherwise, it is appreciated that discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's devices into other data similarly represented as physical quantities within the computer system devices such as memories, registers or other such information storage, transmission, display devices, or the like.

The algorithms and displays presented herein are not inherently related to any particular computer or other apparatus. Various general purpose systems may be used with programs in accordance with the teachings herein, or it may prove convenient to construct more specialized apparatus to perform the required method. For example, any of the methods according to the various embodiments of the present invention can be implemented in hard-wired circuitry, by programming a general-purpose processor, or by any combination of hardware and software.

One of skill in the art will immediately appreciate that the invention can be practiced with computer system configurations other than those described below, including hand-held devices, multiprocessor systems, microprocessor-based or programmable consumer electronics, digital signal processing (DSP) devices, network PCs, minicomputers, mainframe computers, and the like. The invention can also be practiced in distributed computing environments where tasks are performed by remote processing devices that are linked through a communications network. The required structure for a variety of these systems will appear from the description below.

It is to be understood that various terms and techniques are used by those knowledgeable in the art to describe communications, protocols, applications, implementations, mechanisms, etc. One such technique is the description of an implementation of a technique in terms of an algorithm or mathematical expression. That is, while the technique may be, for example, implemented as executing code on a computer, the expression of that technique may be more aptly and succinctly conveyed and communicated as a formula, algorithm, or mathematical expression.

Thus, one skilled in the art would recognize a block denoting A+B=C as an additive function whose implementation in hardware and/or software would take two inputs (A and B) and produce a summation output (C). Thus, the use of formula, algorithm, or mathematical expression as descriptions is to be understood as having a physical embodiment in at least hardware and/or software (such as a computer system in which the techniques of the embodiments of the present invention may be practiced as well as implemented as an embodiment).

In an embodiment, the methods of the various embodiments of the present invention are embodied in machine-executable instructions. The instructions can be used to cause a general-purpose or special-purpose processor that is programmed with the instructions to perform the methods of the embodiments of the present invention. Alternatively, the methods of the embodiments of the present invention might be performed by specific hardware components that contain hardwired, logic for performing the methods, or by any combination of programmed computer components and custom hardware components.

In one embodiment, the present invention may be provided as a computer program product which may include a machine or computer-readable medium having stored thereon instructions which may be used to program a computer (or other electronic devices) to perform a process according to one embodiment of the present invention. The computer-readable medium may include, but is not limited to, floppy diskettes, optical disks, Compact Disc, Read-Only Memory (CD-ROMs), and magneto-optical disks, Read-Only Memory (ROMs), Random Access Memory (RAMs), Erasable Programmable Read-Only Memory (EPROMs), Electrically Erasable Programmable Read-Only Memory (EEPROMs), magnetic or optical cards, flash memory, or the like.

Accordingly, the computer-readable medium includes any type of media/machine-readable medium suitable for storing electronic instructions. Moreover, one embodiment of the present invention may also be downloaded as a computer program product. As such, the program may be transferred from a remote computer (e.g., a server) to a requesting computer (e.g., a client). The transfer of the program may be by way of data signals embodied in a carrier wave or other propagation medium via a communication link (e.g., a modem, network connection or the like).

Computing Architecture

FIG. 1 shows a computer system 100 upon which one embodiment of the present invention can be implemented. In one embodiment, computer system 100 is, for example, an SIMD extension architecture including, a bus 102 for communicating information, and processor 110 coupled to bus 102 for processing information. The computer system 100 also includes a memory subsystem 104–108 coupled to bus 102 for storing information and instructions for processor 110. Processor 110 includes an execution unit 130 containing an arithmetic logic unit (ALU) 180, a register file 200 and one or more cache memories 160 (160-1, . . . , 160-N).

High speed, temporary memory buffers (cache) 160 are coupled to execution unit 130 and store frequently and/or recently used information for processor 110. As described herein, memory buffers 160, include but are not limited to cache memories, solid state memories, RAM, synchronous RAM (SRAM), synchronous data RAM (SDRAM) or any device capable of supporting high speed buffering of data. Accordingly, high speed, temporary memory buffers 160 are referred to interchangeably as cache memories 160 or one or more memory buffers 160.

In one embodiment of the invention, register file 200 includes multimedia registers, for example, SIMD (single instruction, multiple data) registers for storing multimedia information. In one embodiment, multimedia registers each store up to one hundred twenty-eight bits of packed data. Multimedia registers may be dedicated multimedia registers or registers which are used for storing multimedia information and other information. In one embodiment, multimedia registers store multimedia data when performing multimedia operations and store floating point data when performing floating point operations.

In one embodiment, execution unit 130 operates on image/video data according to the instructions received by processor 110 that are included in instruction set 140. Execution unit 130 also operates on packed, floating-point and scalar data according to instructions implemented in general-purpose processors. Processor 110 as well as cache processor 400 are capable of supporting the Pentium® microprocessor instruction set as well as packed instructions, which operate on packed data. By including a packed instruction set in a standard microprocessor instruction set, such as the Pentium® microprocessor instruction set, packed data instructions can be easily incorporated into existing software (previously written for the standard microprocessor instruction set). Other standard instruction sets, such as the PowerPC™ and the Alpha™ processor instruction sets may also be used in accordance with the embodiments of the invention. (Pentium® is a registered trademark of Intel Corporation. PowerPC™ is a trademark of IBM, APPLE COMPUTER and MOTOROLA. Alpha™ is a trademark of Digital Equipment Corporation.)

In one embodiment, the present invention provides a system compiler for detection of serial code statements to implement saturation/clipping operations, as well as vectorization of the detected serial code. As described in further below, the system compiler detects conditional constructs within a source program that are utilized to explicitly code saturation/clipping operations during arithmetic computations. As indicated above, explicit coding of saturation/clipping operations is required since high level programming languages, such as C, C++ and Fortran, lack saturation, as well as clipping, operations.

As known to those skilled in the art, saturation, as well as clipping instructions, are commonly used within, for example, graphics applications, to avoid anomalies where standard wraparound arithmetic would make bright pixels darker, instead of brighter. As described herein, wraparound arithmetic refers to arithmetic where higher bytes of a result that require more than a predetermined number of bits (e.g., 32 bits) are simply truncated. In contrast, saturation arithmetic saturates higher/lower bytes of a result to a predetermined value to avoid wraparound anomalies.

Accordingly, in one embodiment, the method includes the analysis of source program code to identify source code utilizing conditional constructs to perform saturation/clipping operations. Once analysis is complete, identified source code is vectorized to implement identified saturation/clipping operations utilizing single instruction, multiple data (SIMD) saturation/clipping instructions. Accordingly, utilizing embodiments of the present invention, conditional expressions utilized to implement saturation arithmetic, as well as clipping of data values, such as pixel values within graphics applications, are replaced with SIMD saturation arithmetic instructions, as well as clipping instructions.

Consequently, users of high-level programming languages are required to generate explicit code, using "if" statements or conditional expressions (conditional constructs), code statements that test the value of operands before actual arithmetic operations are performed. However, the computer system 100, as depicted in FIG. 1, includes instruction set 140, which includes SIMD instructions for performing both saturation operations, as well as clipping operations.

TABLE 1

Instructions for Saturation Arithmetic

| Instruction | Description |
| --- | --- |
| PADDSB/PSUBSB | Add/Subtract signed packed bytes from source to destination and saturate |
| PADDSW/PSUBSW | Add/Subtract signed packed words from source to destination and saturate |
| PADDUSB/PSUBUSB | Add/Subtract unsigned packed bytes from source to destination and saturate |
| PADDUSW/PSUBUSW | Add/Subtract unsigned packed words from source to destination and saturate |

TABLE 2

Instructions for Clipping

| Instruction | Description |
| --- | --- |
| PMINUB/PMAXUB | Compute minimum/maximum of unsigned packed bytes in source and destination |
| PMINSW/PMAXSW | Compute minimum/maximum of signed packed words in source and destination |

As indicated, instruction set 140 includes saturation addition (PADD), as well as saturation subtraction (PSUB). As further described with reference to Table 1, the saturation arithmetic instructions can be utilized to perform saturation addition, as well as subtraction, on signed byte and word values, as well as unsigned byte and word values. In addition, instruction set 140 includes clipping instructions, which are described with reference to Table 2. As indicated by Table 2, SIMD minimum operations (PMIN), as well as STMD maximum instructions (PMAX) are provided in order to clip values utilizing MIN/MAX instructions on unsigned byte values, as well as signed word values.

As recognized by those skilled in the art, instruction set 140 includes a subset of available saturation, as well as clipping instructions, in order to provide a subset of possible clipping, as well as saturation instructions, available from computer system 100. Accordingly, as will be recognized by those skilled in the art, instruction set 140 is not limited to the listed saturation/clipping instructions. As such saturation and clipping instructions are provided to give sufficient understanding of the embodiments of the invention while avoiding obscuring the details of the embodiments of the present invention by listing all possible saturation and clipping operations.

Consequently, once explicitly coded, saturation/clipping operations are detected within a source program, the identified saturation/clipping operations are replaced with, for example, saturation/clipping instructions from Tables 1 and 2, as well as instruction set 140, in order to vectorize the explicitly coded statements utilized to perform saturation/clipping arithmetic. Consequently, in one embodiment, when such identified serial code statements are detected, the system compiler replaces the detected serial code statements with SIMD saturation/clipping instruction code statements to perform the explicitly coded saturation/clipping arithmetic operation.

Still referring to FIG. 1, the computer system 100 of the present invention may include one or more I/O (input/output) devices 120, including a display device such as a monitor. The I/O devices 120 may also include an input device such as a keyboard, and a cursor control such as a mouse, trackball, or trackpad. In addition, the I/O devices may also include a network connector such that computer system 100 is part of a local area network (LAN) or a wide area network (WAN), the I/O devices 120, a device for sound recording, and/or playback, such as an audio digitizer coupled to a microphone for recording voice input for speech recognition. The I/O devices 120 may also include a video digitizing device that can be used to capture video images, a hard copy device such as a printer, and a CD-ROM device.

Processor

FIG. 2 illustrates a detailed diagram of processor 110. Processor 110 can be implemented on one or more substrates using any of a number of process technologies, such as, BiCMOS, CMOS, and NMOS. Processor 110 may include a decoder 170 for decoding control signals and data used by processor 110. Data can then be stored in register file 200 via internal bus 190. As a matter of clarity, the registers of an embodiment should not be limited in meaning to a particular type of circuit. Rather, a register of an embodiment need only be capable of storing and providing data, and performing the functions described herein.

Depending on the type of data, the data may be stored in integer registers 202, registers 210, registers 214, status registers 208, or instruction pointer register 206. Other registers can be included in the register file 204, for example, floating point registers 204. In one embodiment, integer registers 202 store thirty-two bit integer data. In one embodiment, registers 210 contains eight multimedia registers, $R_0$ 212-1 through $R_7$ 212-7, for example, single instruction, multiple data (SIMD) registers containing packed data. In one embodiment, each register in registers 210 is one hundred twenty-eight bits in length. $R_1$ 212-1, $R_2$ 212-2 and $R_3$ 212-3 are examples of individual registers in registers 210. Thirty-two bits of a register in registers 210 can be moved into an integer register in integer registers 202. Similarly, value in an integer register can be moved into thirty-two bits of a register in registers 210.

In one embodiment, registers 214 contains eight multimedia registers, 216-1 through 216-N, for example, single instruction, multiple data (SIMD) registers containing packed data. In one embodiment, each register in registers 214 is sixty-four bits in length. Thirty-two bits of a register in registers 214 can be moved into an integer register in integer registers 202. Similarly, value in an integer register can be moved into thirty-two bits of a register in registers 214. Status registers 208 indicate the status of processor 109. In one embodiment, instruction pointer register 211 stores the address of the next instruction to be executed. Integer registers 202, registers 210, status registers 208, registers 214, floating-point registers 204 and instruction pointer register 206 all connect to internal bus 190. Any additional registers would also connect to the internal bus 190.

In another embodiment, some of these registers can be used for different types of data. For example, registers 210/214 and integer registers 202 can be combined where each register can store either integer data or packed data. In another embodiment, registers 210/214 can be used as floating point registers. In this embodiment, packed data or floating point data can be stored in registers 210/214. In one embodiment, the combined registers are one hundred ninety-two bits in length and integers are represented as one hundred ninety-two bits. In this embodiment, in storing packed data and integer data, the registers do not need to differentiate between the two data types.

Execution unit 130, in conjunction with, for example ALU 180, performs the operations carried out by processor 110. Such operations may include shifts, addition, subtraction and multiplication, etc. Functional unit 130 connects to internal bus 190. In one embodiment, the processor 110 includes one or more memory buffers (cache) 160. The one or more cache memories 160 can be used to buffer data and/or control signals from, for example, main memory 104.

Data and Storage Formats

Figure 3A:
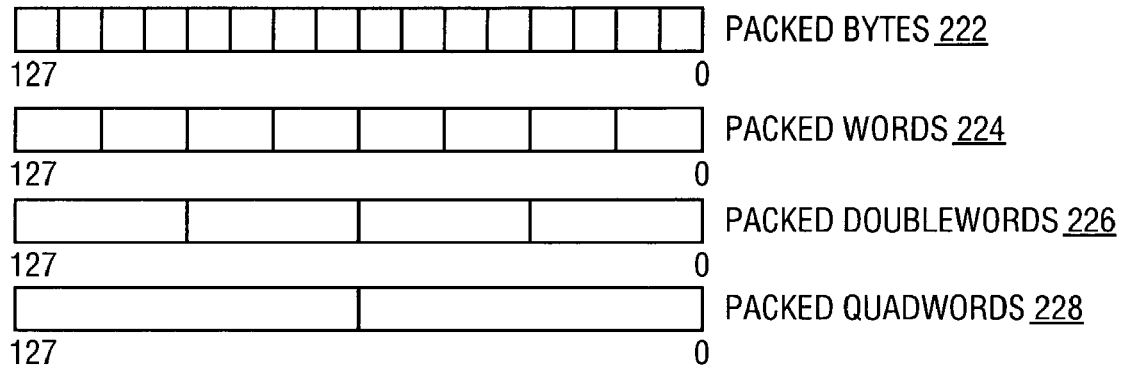
FIGS. 3A and 3B depict block diagrams illustrating 128-bit packed SIMD data types, in accordance with one embodiment of the present invention.
Figure 3B:
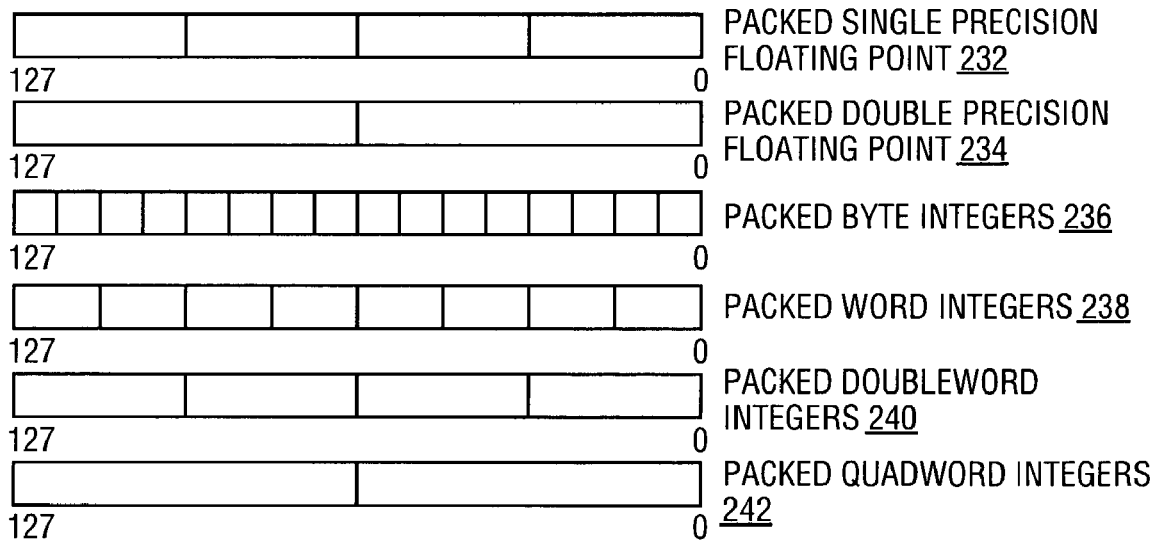

Referring now to FIGS. 3A and 3B, FIGS. 3A and 3B illustrate 128-bit SIMD data type according to one embodiment of the present invention. FIG. 3A illustrates four 128-bit packed data-types 220, packed byte 222, packed word 224, packed doubleword (dword) 226 and packed quadword 228. Packed byte 222 is one hundred twenty-eight bits long containing sixteen packed byte data elements. Generally, a data element is an individual piece of data that is stored in a single register (or memory location) with other data elements of the same length. In packed data sequences, the number of data elements stored in a register is one hundred twenty-eight bits divided by the length in bits of a data element.

Packed word 224 is one hundred twenty-eight bits long and contains eight packed word data elements. Each packed word contains sixteen bits of information. Packed doubleword 226 is one hundred twenty-eight bits long and contains four packed doubleword data elements. Each packed doubleword data element contains thirty-two bits of information. A packed quadword 228 is one hundred twenty-eight bits long and contains two packed quad-word data elements. Thus, all available bits are used in the register. This storage arrangement increases the storage efficiency of the processor. Moreover, with multiple data elements accessed simultaneously, one operation can now be performed on multiple data elements simultaneously.

FIG. 3B illustrates 128-bit packed floating-point and Integer Data types 230 according to one embodiment of the invention. Packed single precision floating-point 232 illustrates the storage of four 32-bit floating point values in one of the SIMD registers 210, as shown in FIG. 2. Packed double precision floating-point 234 illustrates the storage of two 64-bit floating-point values in one of the SIMD registers 210 as depicted in FIG. 2. As described in further detail below, packed double precision floating-point 234 may be utilized to store an entire sub-matrix, utilizing two 128-bit registers, each containing four vector elements which are stored in packed double precision floating-point format. Packed byte integers 236 illustrate the storage of 16 packed integers, while packed word integers 238 illustrate the storage of 8 packed words. Finally, packed doubleword integers 240 illustrate the storage of four packed doublewords, while packed quadword integers 242 illustrate the storage of two packed quadword integers within a 128-bit register, for example as depicted in FIG. 2.

Figure 3C:
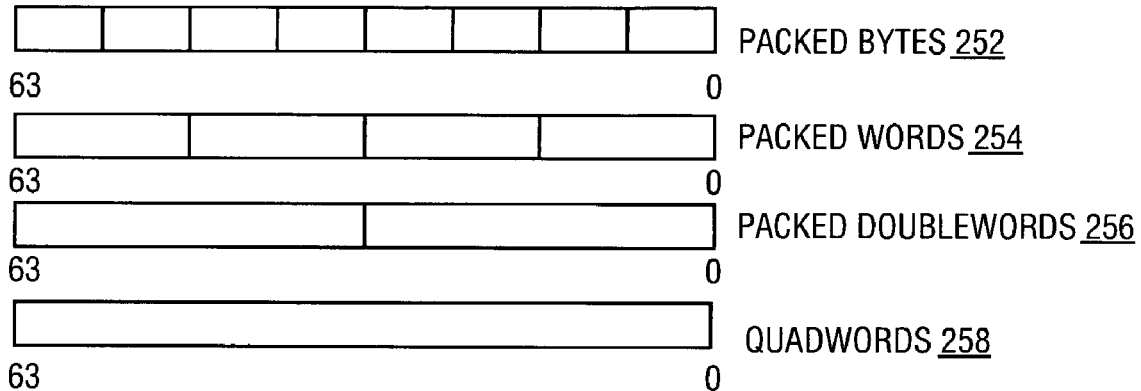
FIGS. 3C and 3D depict block diagrams illustrating 64-bit packed SIMD data types in accordance with the further embodiment of the present invention.
Figure 3D:
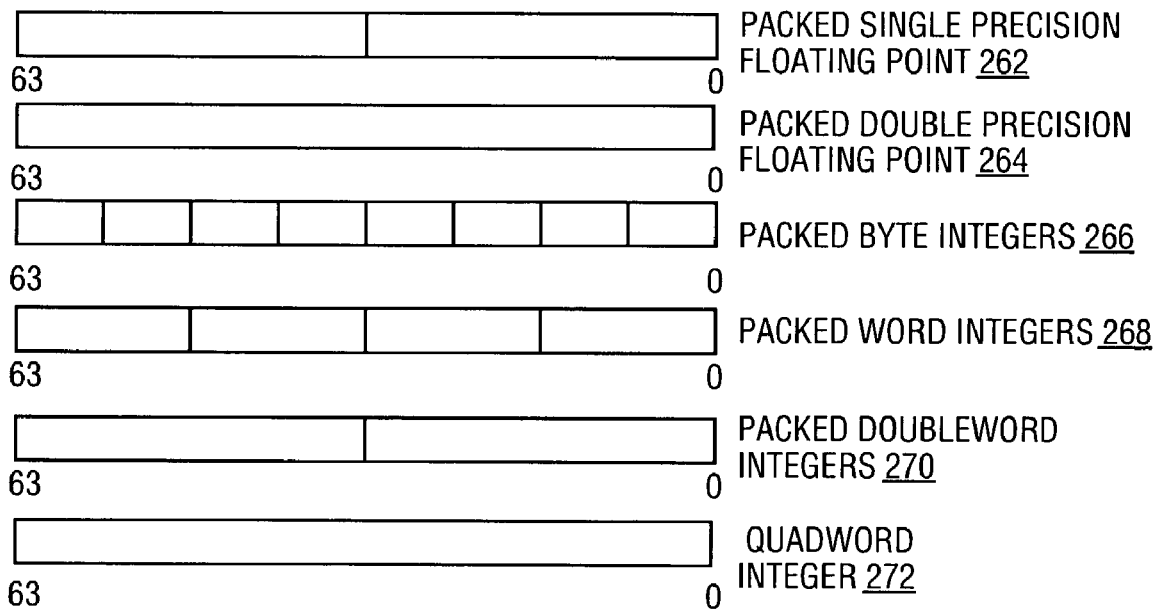

Referring now to FIGS. 3C and 3D, FIGS. 3C and 3D depict blocked diagrams illustrating 64-bit packed single instruction multiple data (SIMD) data types, as stored within registers 214, in accordance with one embodiment of the present invention. As such, FIG. 3C depicts four 64-bit packed data types 250, packed byte 252, packed word 254, packed doubleword 256 and quadword 258. Packed byte 252 is 64 bits long, containing 8 packed byte data elements. As described above, in packed data sequences, the number of data elements stored in a register is 64 bits divided by the length in bits of a data element. Packed word 254 is 64 bits long and contains 4 packed word elements. Each packed word contains 16 bits of information. Packed doubleword 256 is 64 bits long and contains 2 packed doubleword data elements. Each packed doubleword data element contains 32 bits of information. Finally, quadword 258 is 64 bits long and contains exactly one 64-bit quadword data element.

Referring now to FIG. 3D, FIG. 3D illustrates 64-bit packed floating-point and integer data types 260, as stored within registers 214, in accordance with a further embodiment of the present invention. Packed single precision floating point 262 illustrates the storage of two 32-bit floating-pint values in one of the SIMD registers 214 as depicted in FIG. 2. Packed double precision floating-point 264 illustrates the storage of one 64-bit floating point value in one of the SIMD registers 214 as depicted in FIG. 2. Packed byte integer 266 illustrates the storage of eight 32-bit integer values in one of the SIMD registers 214 as depicted in FIG. 2. Packed doubleword integer 270 illustrates the storage of two 32-bit integer values in one of the SIMD registers 214 as depicted in FIG. 2. Finally, quadword integer 272 illustrates the storage of a 64-bit integer value in one of the SIMD registers 214 as depicted in FIG. 2.

Explicit Saturation/Clipping Operation Detection

As indicated above, computer system 100, as depicted in FIG. 1, provides SIMD saturation (142–148) and clipping (150 and 152) instructions. However, in order to utilize the saturation and clipping instructions provided within instruction set 140, the instructions must be provided by hand optimizing an application using inline assembly or extrinsics to exploit these SIMD saturation/clipping instructions. Unfortunately, such hand optimizations are often a tedious task for computer programmers. In other words, in one embodiment, the instructions provided via instruction set 140 are assembly language instructions, which are generated by a compiler when detected via inline assembly, or extrinsics, within a high level source program.

Unfortunately, as described above, high level programming languages do not include constructs for performing saturation/clipping operations utilizing standard, high-level code. Consequently, arithmetic operations within, for example, graphics applications, are generally explicitly coded utilizing conditional constructs to avoid anomalies due to standard wraparound arithmetic. In other words, saturation arithmetic, as well as clipping, is generally performed within high-level programs by utilizing explicitly coded "if" statements or conditional expressions that test the value of operands prior to performance of arithmetic operations.

Accordingly, one embodiment of the present invention provides a system compiler that analyzes conditional constructs within source program code to detect explicitly coded serial statements to perform saturation/clipping operations during arithmetic operations. However, in order to detect explicitly coded saturation/clipping operations, one embodiment of the present invention describes an intermediate modification of source program code in order to detect explicitly coded serial statements to perform minimum/maximum operations.

TABLE 3

SIGNED/UNSIGNED DATA TYPES

| typedef | unsigned | char  | u8;  | /* $V_{u8}$ = {   | 0, ...,         | 255}        | */ |
|---------|----------|-------|------|-------------------|-----------------|-------------|----|
| typedef | signed   | char  | s8;  | /* $V_{s8}$ = {   | −128, ...       | 127}        | */ |
| typedef | unsigned | short | u16; | /* $V_{u16}$ = {  | 0, ...,         | 65535}      | */ |
| typedef | signed   | short | s16; | /* $V_{s16}$ = {  | −32768, ...,    | 32767}      | */ |
| typedef | unsigned | int   | u32; | /* $V_{u32}$ = {  | 0, ...,         | 4294967295} | */ |
| typedef | signed   | int   | s32; | /* $V_{s32}$ = {  | −2147483648, ..., | 2147483647} | */ |

In one embodiment, the system compiler of computer system 100 supports integral minimum (MIN)/maximum (MAX) operators with, for example, 32-bit precision. As known to those skilled in the art, MIN/MAX operators provide various advantages, such as for example, improving program analysis by reducing conditional flow of control statements, in addition to implementing efficient code generation. Consequently, the detection of explicitly coded saturation/clipping operations begins with the detection of serial code statements utilizing conditional constructs to implement MIN/MAX operations.

In one embodiment, the detection begins by comparing detected conditional statements with MIN/MAX operation pattern rewrite rules as provided below. However, in order assist understanding of the following rewrite rules, Table 3 defines several data types, as listed in Table 3, in order to help illustrate the detection of explicitly coded saturation/clipping operations. As indicated by Table 3, the implementation of 32-bit relational operators ($\leq,<,\geq,>$) requires a distinction between signed (s) and unsigned (u) operands, as illustrated by the various data types defined in Table 3. A similar distinction is also required for 32-bit additive operators ("+", "−").

As described herein, wraparound arithmetic refers to arithmetic where higher bytes of a result that require more than a predetermined number of bits (e.g., 32 bits) are simply truncated. Consequently, in graphics applications, anomalies can occur since standard wraparound arithmetic results in the truncation of high order values. In fact, truncation can cause a bright pixel to turn black instead of brighter. As a result, graphics programmers are generally required to explicitly code "if" statements, or conditional expressions, that test the value of operands before the arithmetic operations are performed in order to avoid standard wraparound arithmetic.

As described in further detail below, vectorization of explicitly coded saturation/clipping arithmetic requires proper data type maintenance and conversion. Consequently, the remainder of the specification utilizes the following notation $\phi$ (x, V) to denote the condition that the system compiler can prove that an expression "x" can only have values in the set V. In the embodiments described herein, the following rules are provided as a basic implementation of the $\phi$ condition:

Rule 1

$$\phi(c, V) \text{ holds for any constant } c \in V \quad (1)$$

Rule 2

$\phi((t)y, V)$ holds for a type cast of expression "y" into type t, where $\phi(t,V)$, if either (a) $t=u32$ and $\phi(t,\{u8, u16\})$, or (b) $t=s32$ and $$\phi(t, \{u8, u16, s8, s16\}). \quad (2)$$

For example, $\phi((int)c, \{0,255\})$ holds for a variable "c" of type u8, independent of the program context in which this expression appears. Clearly, this basic implementation can be enhanced by adding more rules or even using the program context of an expression to derive stricter conditions on the possible values of this expression. However, details for deriving stricter conditions are omitted in order to avoid obscuring the details of the embodiments of the present invention.

Consequently, utilizing Rules 1 and 2, in one embodiment, the invention ensures proper evaluation of signed and unsigned operands, as well as required implicit, as well as explicit, type conversions, in accordance with the rules required by the high level programming language, such as for example, C, C++ and Fortran. Therefore, utilizing embodiments in accordance with the present invention, explicitly coded saturation arithmetic is detected and converted into SIMD saturation, as well as clipping, instructions.

As indicated above, the detection of saturation/clipping operations begins with the conversion of serial code statements into MIN/MAX operation statements within an internal representation of the source program code generated by the system compiler. In one embodiment, the detection of serial code statements implementing MIN/MAX operations is driven by the following MIN/MAX operation patterns, as well as corresponding MIN/MAX rewrite rules, as provided in Table 4.

TABLE 4

MIN/MAX REWRITE RULES

| | |
|---|---|
| if ($x_{u32} >_u y_{u32}$) then<br>   $y_{u32} = x_{u32}$<br>endif | → $y_{u32} = MAX_u (x_{u32}, y_{u32})$ |
| if ($x_{s32} =_s y_{s32}$) then<br>   $t_{s32} = x_{s32}$<br>else<br>   $t_{s32} = y_{s32}$<br>endif | → $t_{s32} = MIN_s (x_{s32}, y_{s32})$ |

TABLE 4-continued

MIN/MAX REWRITE RULES if ((s32) $x_{s16} <_u$ (s32)$y_{s16}$) then
   $y_{s16} = x_{s16}$         → $y_{s16}$ = (s16) $MIN_s$ ((s32)$x_{s16}$, (s32)$y_{s16}$)
endif if (d $<_u x_{u32}$) then
   $t_{u32}$ = d
else                      → if c $<_u$ d →    $t_{u32} = MIN_u(MAX_u(x_{u32}, c), d)$
   $t_{u32} = (MAX_u(x_{u32}, c))$
endif if (c $>_u x_{u32}$) then
   $t_{u32} = d +_u x_{u32}$
else                      → if e == d $+_u$ c → $t_{u32}$ = d $+_u$ $MIN_u$ ($x_{u32}$, c)
   $t_{u32}$ = e
endif As described above, the various MIN/MAX operation patterns are utilized by, for example, graphics programmers, in order to perform saturation, as well as clipping, arithmetic. Utilizing the MIN/MAX operation patterns provided in Table 4, in one embodiment, the system compiler compares serial code statements to the various operation patterns in order to detect matching serial code statements. Consequently, by detecting matching MIN/MAX operation pattern serial code statements, the system compiler can eventually detect saturation/clipping operations within source program code. As a result, when serial code statements match a MIN/MAX operation pattern, the respective conditional statement is converted into the MIN/MAX format provided in Table 4.

Accordingly, in one embodiment, the system compiler preliminarily generate an intermediate representation of source program code. Once the intermediate representation is generated, the system compiler performs a pass over the intermediate representation to determine matching conditional statements according to the MIN/MAX operation patterns provided in Table 4. When a matching conditional statement is detected, the system compiler replaces matching conditional expressions with appropriate MIN/MAX operators, in accordance with corresponding MIN/MAX rewrite rules.

TABLE 5 a = (10 < ((b*c > 20) ? 20 : b*c))
   ? ((b*c > 20) ? 20 : b*c) : 10;

TABLE 6 a = $MAX_s$ ( $MIN_s$ (b*c, 20) 10);

For example, as indicated in Table 5, Table 5 provides a serial code statement implementing a conditional expression. Based on the conditional expression provided in Table 5, the system compiler replaces an internal representation of the source program containing the conditional expression with the MIN/MAX instruction and statement provided in Table 6.

TABLE 7

| | |
|---|---|
| d $+_s$ $MIN_s$ ($x_{s32}$, c) | → $MIN_s$ (d $+_s$ $x_{s32}$, d $+_s$ c) |
| d $+_s$ $MAX_s$ ($x_{s32}$, c) | → $MAX_s$ (d $+_s$ $x_{s32}$, d $+_s$ c) |
| d $-_s$ $MIN_s$ ($x_{s32}$, c) | → $MAX_s$ (d $-_s$ $x_{s32}$, d $-_s$ c) |
| d $-_s$ $MAX_s$ ($x_{s32}$, c) | → $MIN_s$ (d $-_s$ $x_{s32}$, d $-_s$ c) |
| d $+_u$ $MIN_u$ ($x_{s32}$, c) | → $MIN_u$ (d $+_u$ $x_{u32}$, d $+_u$ c) |
| $MAX_s$ ($x_{u32}$, c) $-_u$ d | → (u32) $MAX_s$ ((s32)$x_{u32}$, $-_s$ d, c $-_s$ d) |
| d $-_u$ $MIN_u$ ($x_{u32}$, c) | → (u32) $MAX_s$ (d $-_s$ (s32)$x_{u32}$, d $-_s$ c) |
| d $-_u$ $MAX_u$ ($x_{u32}$, c) | → (u32) $MIN_s$ (d $-_s$ (s32)$x_{u32}$, d $-_s$ c) |

Furthermore, in one embodiment, generation of the intermediate representation of the source program code explicitly converts conditional expressions ("VIZ. (x) ? y: z") into "if", "then", "else" constructs, which reduces the number of rewriting rules required. Consequently, the explicit conversion simplifies the detection of matching MIN/MAX operation patterns. Once conversion of identified conditional expressions into MIN/MAX operations is performed, in one embodiment, the system compiler further modifies the generated MIN/MAX operation statements.

In one embodiment, MIN/MAX operation statements within the internal representation of the source program code are further compared against arithmetic rewrite rules, as provided in Table 7. However, application of the arithmetic rewrite rules is limited to situations where the application is useful (potential for exposing a saturation operation) and valid (preserves the semantics of the original code).

Consequently, when a MIN/MAX operation statement matches an arithmetic operation pattern, as provided in Table 7, a corresponding arithmetic pattern rewrite rule is utilized to replace the detected MIN/MAX operation statement within the internal representation of the source program code. Following application of the arithmetic operation patterns to convert the internal representation to utilize MIN/MAX operation statements (as well as conditional application of the arithmetic rewrite rules) in place of matching conditional expressions, detection of saturation, as well as clipping operations, is performed.

TABLE 8

| | | |
|---|---|---|
| Unsigned pattern: | MIN(e1+e2,v) = SAT_ADD(e1,e2) | where v == high |
| Signed pattern: | MIN(e1+c, v) = SAT_ADD(e1,c) | where v == high and 0 <= c <= high |
| Unsigned pattern: | MAX(e1−e2,v) = SAT_SUB(e1,e2) | where v == low |
| Signed pattern: | MAX(e1−c, v) = SAT_SUB(e1,c) | where v == low and 0 <= c <= high |

TABLE 9

Signed patterns (double clipping);

| | | |
|---|---|---|
| MAX ( MIN(e1+e2, w), v) == SAT_ADD(e1,e2) | where v == low, | w == high |
| MAX ( MIN(e1−e2, w), v) == SAT_SUB(e1,e2) | where v == low, | w == high |
| MIN ( MAX(e1+e2, w), v) == SAT_ADD(e1,e2) | where v == high, | w == low |
| MIN ( MAX(e1−e2, w), v) == SAT_SUB(e1,e2) | where v == high, | w == low |

In one embodiment, the detection of saturation operations is performed by comparing MIN/MAX operation statements against the saturation operation patterns, a simplified subset of which is provided in Tables 8 and 9. In accordance with this embodiment of the present invention, when the system compiler detects a MIN/MAX operation that matches a saturation/clipping operation pattern, for example, as provided in Tables 8 and 9, the internal representation is marked with a corresponding saturation/clipping SIMD instruction.

As indicated by Tables 10 and 11, the corresponding saturation addition, as well as subtraction, operations are provided to replace detected and matching MIN/MAX operations in the internal source code representation. However, the actual vectorization to use the SIMD saturation operations is conditioned on the value of the constant (c). For example, as indicated by FIGS. 4A and 4B, signed saturation for a single clip operation is performed when the evaluation of the $\phi$ condition is satisfied. Likewise, one

TABLE 10

| | | | | | |
|---|---|---|---|---|---|
| Mark $MIN_u$ | $(x_{u32} +_u y_{u32},$ | 255u) | as sat-addu8 $(x_{u32} +_u y_{u32})$ | if $\phi (x_{u32}, v_{u8})$ | $\wedge \phi (y_{u32}, v_{u8})$ |
| Mark $MIN_s$ | $(x_{s32} +_s y_{s32},$ | 255 ) | as sat-addu8 $(x_{s32} +_s y_{s32})$ | if $\phi (x_{s32}, v_{u8})$ | $\wedge \phi (y_{s32}, v_{u8})$ |
| Mark $MAX_s$ | $(x_{s32} -_s y_{s32},$ | 0 ) | as sat-addu8 $(x_{s32} -_s y_{s32})$ | if $\phi (x_{s32}, v_{u8})$ | $\wedge \phi (y_{s32}, v_{u8})$ |

TABLE 11

| | | | | | |
|---|---|---|---|---|---|
| Mark $MAX_s$ ($MIN_s$ | $(x_{s32} +_s y_{s32}, 127),$ | −128) | as sat-adds8 $(x_{s32}, y_{s32})$ | if $\phi (x_{s32}, v_{s8})$ | $\wedge \phi (y_{s32}, v_{s8})$ |
| Mark $MAX_s$ ($MIN_s$ | $(x_{s32} -_s y_{s32}, 127),$ | −128) | as sat-subs8 $(x_{s32}, y_{s32})$ | if $\phi (x_{s32}, v_{s8})$ | $\wedge \phi (y_{s32}, v_{s8})$ |
| Mark $MIN_s$ | $(c +_s x_{s32},$ | 127) | as sat-adds8 $(c, x_{s32})$ | if $\phi (x_{s32}, v_{s8})$ | $\wedge$ $0 < c \leq 127$ |
| Mark $MAX_s$ | $(c +_s x_{s32},$ | −128) | as sat-adds8 $(c, x_{s32})$ | if $\phi (x_{s32}, v_{s8})$ | $\wedge$ $-128 \leq c < 0$ |
| Mark $MIN_s$ | $(c -_s x_{s32},$ | 127) | as sat-subs8 $(c, x_{s32})$ | if $\phi (x_{s32}, v_{s8})$ | $\wedge$ $0 < c \leq 127$ |
| Mark $MAX_s$ | $(c -_s x_{s32},$ | −128) | as sat-subs8 $(c, x_{s32})$ | if $\phi (x_{s32}, v_{s8})$ | $\wedge$ $-128 \leq c , 0$ |

For example, as indicated in Table 10, Table 10 provides unsigned SIMD saturation arithmetic operations for 8-bit precision. In addition, as illustrated by Table 11, one embodiment for implementing signed saturation arithmetic is provided by listing saturation/clipping operation patterns. However, SIMD arithmetic operations are not limited to 8-bit precision provided in Tables 10 and 11 and includes at least each of the data types defined in Table 3. Consequently, in one embodiment, the system compiler will mark the internal representation of MIN/MAX operation statements which match the clipping/saturation patterns, a subset of which are provided in Tables 10 and 11.

embodiment of the system compiler utilizes clipping operations patterns (a subset of which is provided in Table 12 for signed 16-bit precision (s16)) in order to detect matching MIN/MAX operation statements within the internal representation of the source program code that perform clipping operations.

Accordingly, when matching MIN/MAX operation statements are detected, the detected MIN/MAX operation statements are marked within the internal representation, along with a corresponding SIMD clipping instruction. Consequently, once the system compiler has completed marking of the internal representation of the source program code to

TABLE 12

| | | | | |
|---|---|---|---|---|
| Mark $MIN_s$ | $(x_{s32} y_{u32})$ | as mins16 $(x_{s32} y_{s32})$ | if $\phi (x_{s32}, v_{s16})$ | $\wedge \phi (y_{u32}, v_{s16})$ |
| Mark $MAX_s$ | $(x_{s32} y_{s32})$ | as maxs16 $(x_{s32} y_{s32})$ | if $\phi (x_{s32}, v_{s16})$ | $\wedge \phi (y_{s32}, v_{s16})$ | identify saturation/clipping operations within the serial code statements of the source program code, the system compiler can begin vectorization of the internal representation of the source program code. However, details regarding implementation of saturation/clipping operation patterns for each data type provided in Table 3 are omitted in order to avoid obscuring details of the embodiments described.

As described herein, vectorization refers to the conversion of serial code statements and the corresponding SIMD instruction statements. This functionality is beneficial since it spares computer programmers from writing inherent optimizing source program code with inline assembly or intrinsics to exploit SIMD instruction statements. As a result, during the compiler assembly code generation, the compiler will test the values of the φ conditions and when the values hold true, a corresponding, marked MIN/MAX instruction statement is replaced with the corresponding SIMD saturation/clipping instruction. As a result, utilizing the system compiler in accordance with embodiments of the present invention, the amount of serial code statements within a target program executable is reduced by replacing the serial code statements with corresponding SIMD instruction statements.

As indicated above, SIMD instruction statements perform a single operation on multiple data elements in parallel in order to improve program efficiency and enable computer architecture optimizations, such as data pipelining. Likewise, the system compiler, in accordance with embodiments of the present invention, eliminates branch instructions utilized within conditional flow of control statements for implementing clipping and saturation operations within high level program code. By eliminating the branch instructions, deeply pipelined microprocessor architectures are ensured to operate correctly.

TABLE 13

```
u8 a[256], b[256];
...
for (i = 0; i < 265; i++) {
    int x = (a[i] < 200) ? a[i]+55 : 255;
    if (x > b[i]) b[i]= x;
}
```

Furthermore, the program will have an overall improved functionality, for example, as indicated by the loop provided in Table 13, which is a data load loop. As described herein, a data load loop refers to a serial code statement within the source program code where a data load/store operation is performed. In addition, the load/store operation is performed a predetermined number of times according to a conditional control flow statement, such as for example, for, while, repeat, due, until statements available from high level programming languages. As indicated in Table 13, a conditional expression determines the behavior of the data load operation for storing data within the array (A[i] and B[i]). Based on the loop provided in Table 13, the system compiler would analyze the loop to determine whether the loop can be vectorized and performed with corresponding SIMD instruction statements.

TABLE 14A

```
for (i = 0; i < 265; i++) {
    int x = 55 + MINS_s ((s32) a[i], 200);
    b[i] = (u8) MAXS_s (x, (s32) b[i]);
}
```

TABLE 14B

```
for (i = 0; i < 265; i++) {
    b[i] = (u8) MAX_s ( MIN_s ((s32) a[i] +55, 255), (s32) b[i] );
}
```

During analysis to detect explicit coding of MIN/MAX operation, the internal representation of the loop provided in Table 13 would be replaced with the MAX instruction provided in Table 14. Next, the constant 55 is moved into the MIN operator. Combined with traditional forward substitution, this eventually yields the rewritten fragment provided in Table 14B. Consequently, utilizing the MAX instruction provided in Table 14B, the system compiler would utilize the saturation/clipping operation patterns, for example, in Tables 8–12 to determine whether the rested MAX instruction statement could be replaced with corresponding SIMD saturation arithmetic instructions.

TABLE 15

| SIMD ASSEMBLY CODE | | |
|---|---|---|
| Back: | | ; xmml is preloaded with |55, . . . , 55| |
| movdqa | xmm0, a[eax] | ; load 16 bytes from a |
| paddusb | xmm0, xmml | ; add 16 bytes from saturate |
| pmaxub | xmm0, b[eax] | ; max 16 bytes from b |
| movdqa | b[eax], xmm0 | ; store 16 bytes into b |
| add | eax, 16 | ; |
| cmp | eax, 256 | ; |
| jl | Back | ; looping logic |

In the embodiment described, the system compiler would generate the following SIMD assembly (vector) code, as provided in Table 15. Consequently, the SIMD assembly code provided in Table 15 efficiently performs the source program loop provided in Table 13 by performing the explicitly coded saturation arithmetic in parallel, utilizing SIMD vector code as provided in Table 15.

Referring now to FIG. 5, FIG. 5 depicts a chart illustrating recognition of saturation/clipping operation patterns within a computer benchmark program. As illustrated in FIG. 5, the system compiler is substantially efficient in detecting saturation/clipping operation patterns within the various signed and unsigned data types, as further illustrated with reference to Table 3.

TABLE 16

```
u16 head [N];
...
for(i = 0; i < N; i++) {
    u32 m = head[i];
    head[i] = (m >= 32768 ? m-32768 : 0);
}
```

Figure 6:
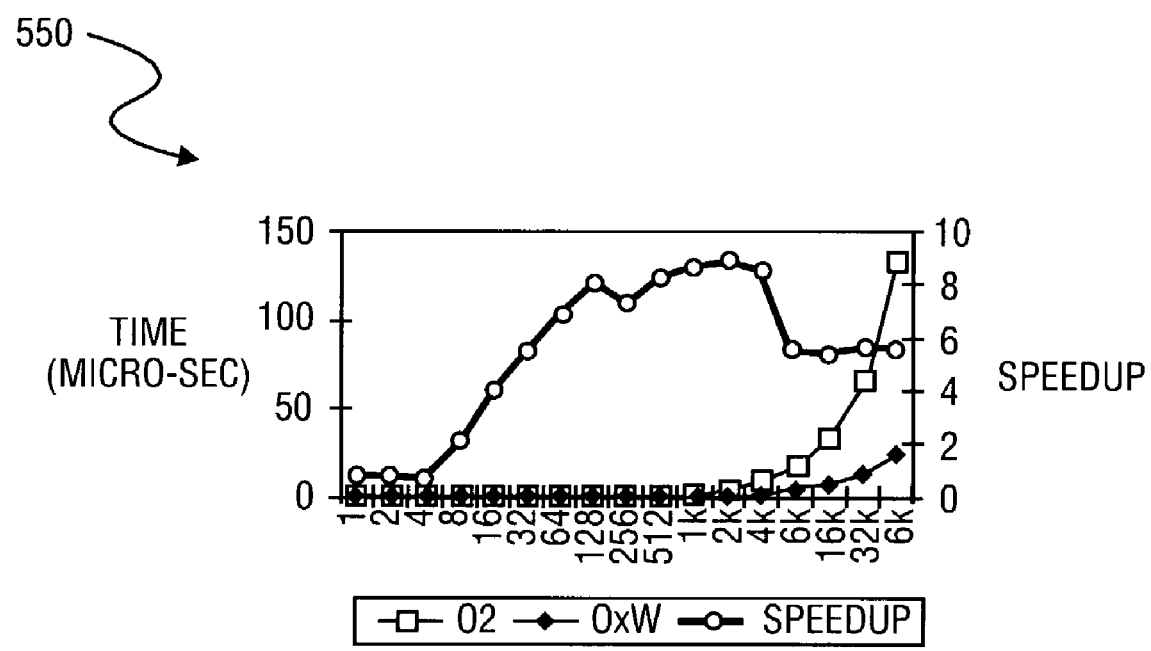
FIG. 6 depicts a graph illustrating execution time and speed up provided by compilation of a benchmark program utilizing a system compiler, in accordance with a further embodiment of the present invention.

As illustrated with reference to Table 16, a fair fraction of the execution time of the benchmark program (164. gzip) from the Standard Performance Evaluation Corporation (SPEC) CPU 2000 benchmarks was spent within the loop provided in Table 16. Consequently, by processing the loop provided in Table 16, assembly code was generated for the loop utilizing SIMD saturation instructions to enable parallel processing of data. The performance gain provided by the system compiler in accordance with embodiments of the present invention is provided and illustrated with reference to FIG. 6. As illustrated by FIG. 6, the execution speed up times for a saturation loop in the 164. gzip benchmark program were significantly improved utilizing embodiments of the present invention.

TABLE 17

| Back: | | | |
|---|---|---|---|
| | | ; xmm1 is preloaded with |32768, . . . ,32768| | |
| movdqa | xmm0, head[eax] | ; load | 8 words from head |
| psubusw | xmm0, xmm1 | ; subtract | 8 words from saturate |
| movdqa | head[eax], xmm0 | ; store | 8 words into head |
| add | eax, 16 | ; | |
| cmp | eax, edx | ; | |
| jl | Back | ; looping logic | |

As illustrated, a scalar version of the loop provided in Table 16 (02), as well as an SIMD version (see Table 17), as indicated QxW, were generated. As illustrated, the corresponding speed up for the application as a whole is limited by the fraction of execution time actually spent in the loop provided in Table 16. However, optimizing specifically for the Pentium IV® processor, as manufactured by Intel Corporation, yielded a 30% improvement over the 02 version. In addition, 7% improvement was provided due to recognition of saturation/clipping operation patterns. Procedural methods for implementing the embodiments of the present invention are now described.

Operation

Figure 7:
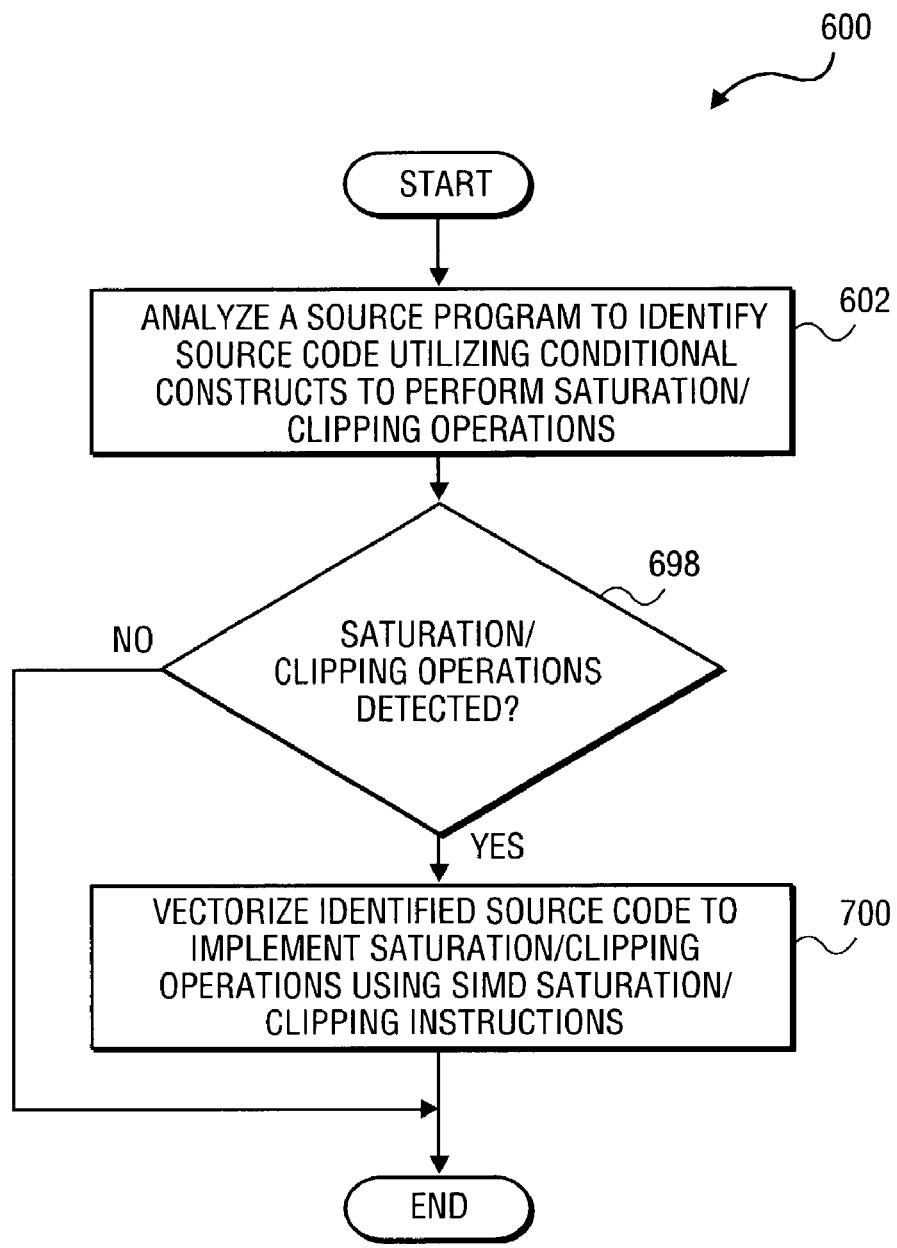
FIG. 7 depicts a flowchart illustrating a method for vectorizing detected saturation and clipping instructions in serial code loops of a source program within, for example, computer system 100, as depicted in FIGS. 1 and 2, in accordance with one embodiment of the present invention.

Referring now to FIG. 7, FIG. 7 depicts a flowchart illustrating a method 600 for vectorization of detected saturation and clipping operations within serial code loops of a source program within, for example, computer system 100, as depicted in FIGS. 1 and 2. At process block 602, a system compiler analyzes a source program to identify source code utilizing conditional constructs to perform saturation/clipping operations. As described below, the conditional constructs to perform saturation/clipping operations generally include conditional expressions, such as "if", "then", "else" statements, which are utilized to check the value of operands prior to arithmetic computation.

Generally, checking, via conditional expressions (statements), is utilized to avoid wraparound arithmetic in order to saturate wraparound values to minimum and maximum values according to the respective data types involved in the arithmetic operation. Once analysis is complete, at process block 698, it is determined whether any saturation/clipping operations were detected during program analysis of process block 602. When saturation/clipping operations were detected, at process block 700, the system compiler vectorizes identified source code to implement saturation/clipping operations using SIMD saturation/clipping instructions, for example, as provided within instruction set 140 of computer system 100, as depicted in FIG. 1, as well as Tables 1 and 2.

Figure 8:
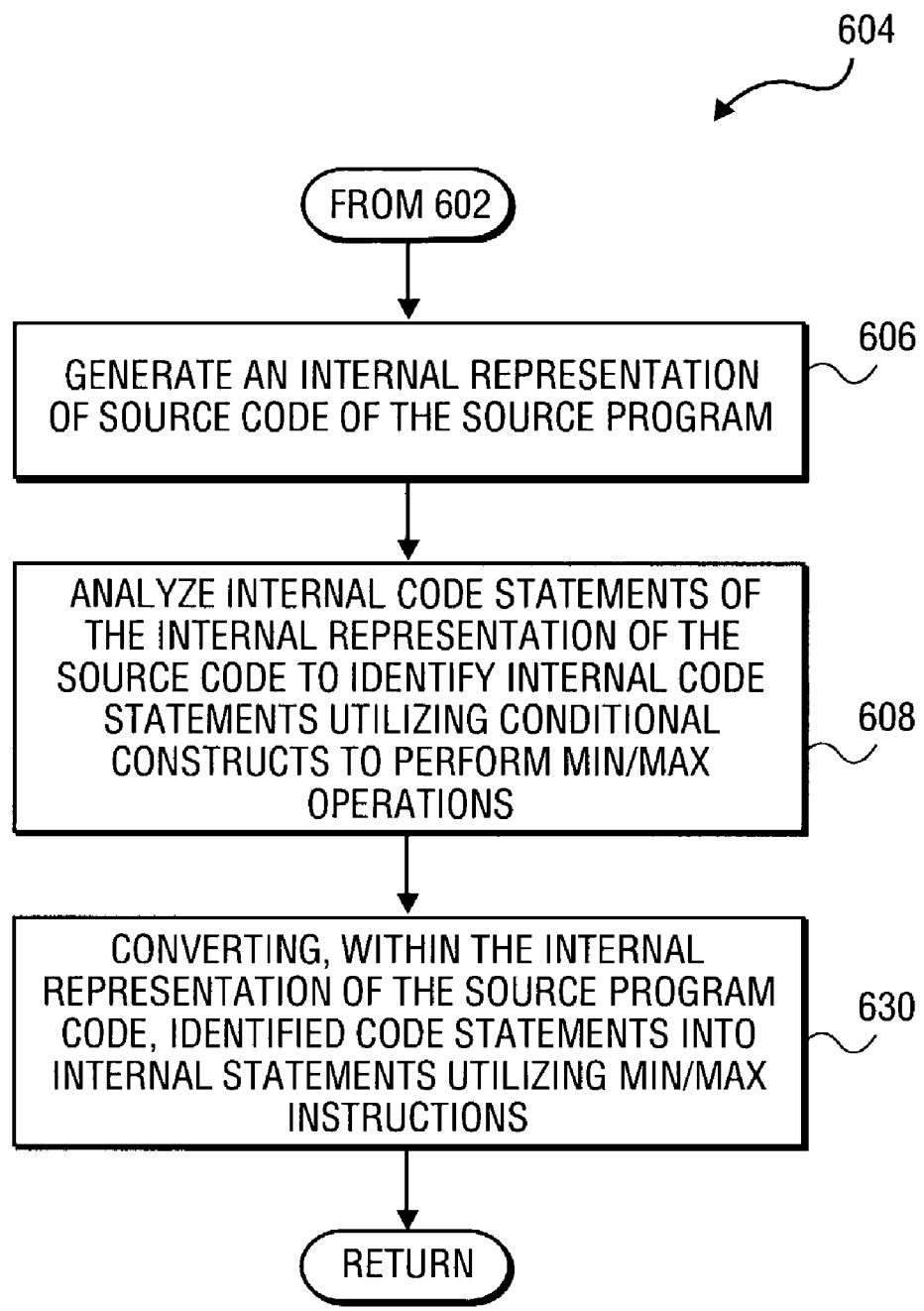
FIG. 8 depicts a flowchart illustrating an additional method for analyzing a source program to identify saturation/clipping operations, in accordance with the further embodiment of the present invention.

Referring now to FIG. 8, FIG. 8 depicts a flowchart illustrating an additional method 604 for analyzing the source program to identify conditional constructs explicitly implementing saturation/clipping operations of process block 602, as depicted in FIG. 7. At process block 606, the system compiler generates an internal representation of a source program. Once the internal representation is complete, at process block 608, the system compiler analyzes internal code statements of the internal representation to identify internal code statements utilizing conditional constructs to perform MIN/MAX operations. In one embodiment, the conditional constructs refer to conditional expressions provided in Table 4. Once analysis is complete, at process block 630, the system compiler converts internal expressions within the internal source program representation into internal expressions utilizing MIN/MAX operators, for example, as depicted in Table 4.

Figure 9:
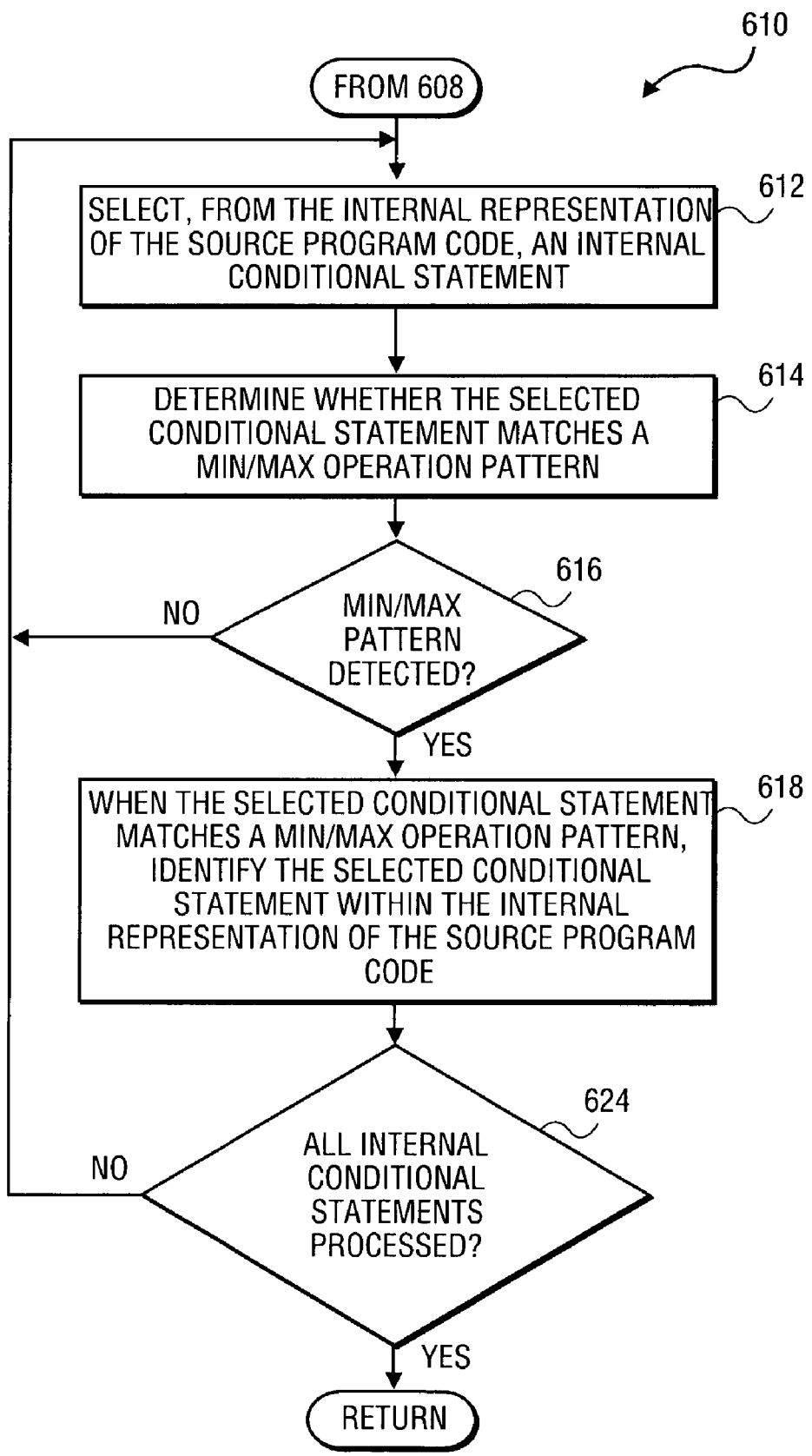
FIG. 9 depicts a flowchart illustrating an additional method for analyzing internal code statements to detect conditional constructs performing MIN/MAX operations, in accordance with the further embodiment of the present invention.

Referring now to FIG. 9, FIG. 9 depicts a flowchart illustrating an additional method 610 for analyzing internal code statements to detect conditional constructs explicitly coded to perform MIN/MAX operations of process block 608, as depicted in FIG. 8. At process block 612, the system compiler selects an internal conditional statement from the internal representation of the source program code. Once selected, at process block 614, the system compiler determines whether the selected conditional statement matches a MIN/MAX operation pattern, for example, as provided in Table 4.

Once comparison of the selected conditional statements is complete, process block 616 is performed. Accordingly, at process block 616, the system compiler performs process block 618 when a conditional statement matches a MIN/MAX operation pattern. Otherwise, control flow branches to process block 620. At process block 618, the system compiler identifies the matching, selected conditional statement within the internal representation of the source program code. Finally, at process block 620, process blocks 612–618 are repeated for each internal conditional statement within the internal representation of the source program code.

Figure 10:
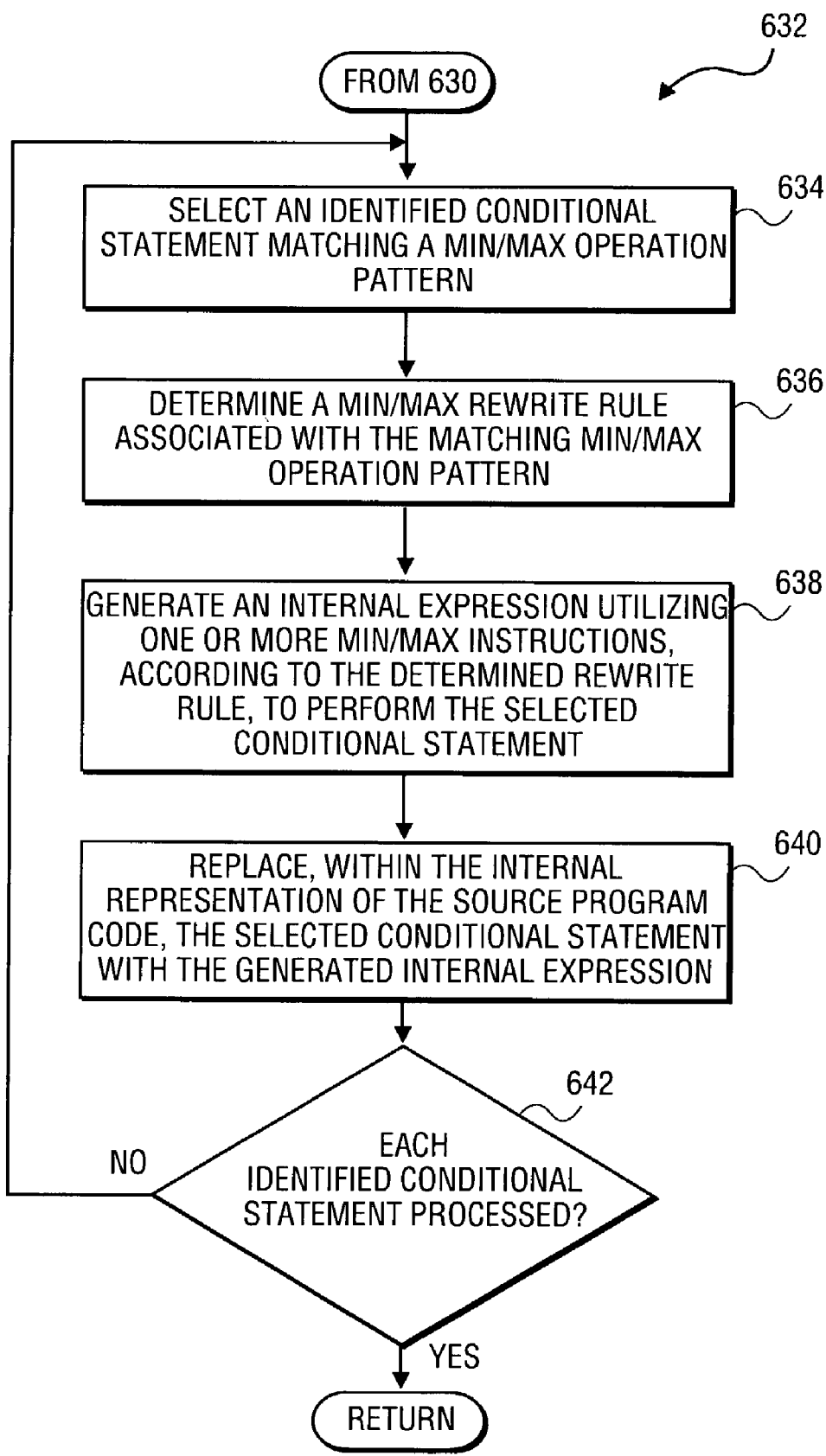
FIG. 10 depicts a flowchart illustrating an additional method for converting identified internal code statements into internal statements utilizing MIN/MAX instructions, in accordance with the further embodiment of the present invention.

Referring now to FIG. 10, FIG. 10 depicts a flowchart illustrating an additional method 632 for converting internal expressions into MIN/MAX internal expressions of process block 630, as depicted in FIG. 8. At process block 634, the system compiler selects a conditional statement, which is identified within the internal representation of the source program code, as matching a MIN/MAX operation pattern. Once selected, at process block 636, the system compiler determines a MIN/MAX rewrite rule associated with the associated MIN/MAX operation pattern.

In one embodiment, this determination of MIN/MAX rewrite rules is performed according to the MIN/MAX rewrite rules provided in Table 4. However, application of the arithmetic rewrite rules is limited to situations where the application is useful (potential for exposing a saturation operation) and valid (preserves the semantics of the original code). Next, at process block 638, the system compiler generates an internal expression utilizing one or more MIN/MAX instructions according to the determined rewrite rule.

Consequently, utilizing the rewrite rules in the embodiment described, an internal MIN/MAX instruction statement is generated to perform the selected conditional statement. Once completed, at process block 640, the selected conditional statement is replaced with the generated internal expression within the internal representation of the source program code. Finally, at process block 642, process blocks 634–640 are repeated for each conditional statement within the internal representation of the source program code that is identified as having a matching MIN/MAX operation pattern.

Figure 11:
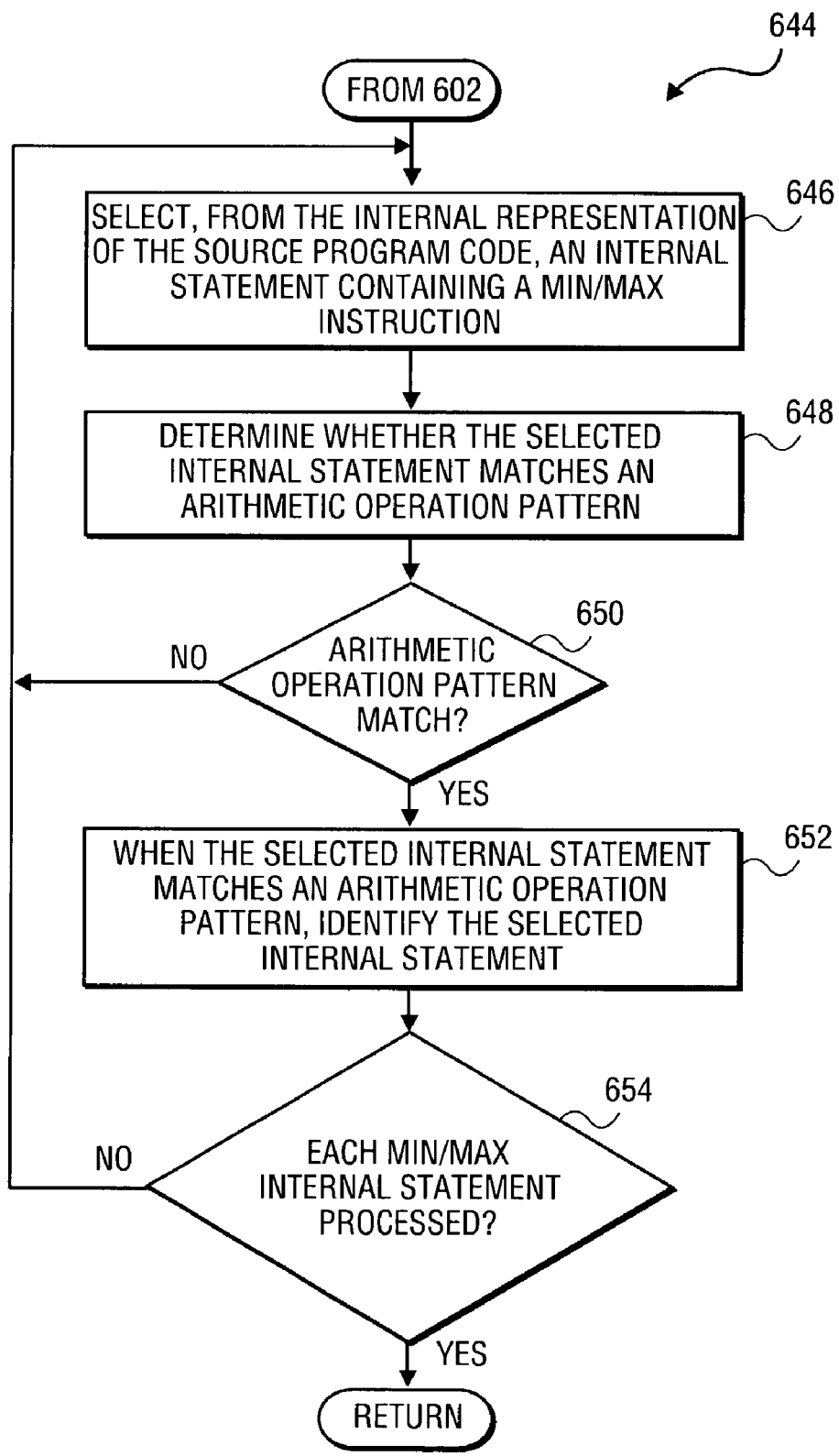
FIG. 11 depicts a flowchart illustrating an additional method for analyzing a source program to identify saturation/clipping operations, in accordance with the further embodiment of the present invention.

Referring now to FIG. 11, FIG. 11 depicts a flowchart illustrating an additional method 644 for analyzing a source program to identify conditional constructs explicitly coded to perform saturation/clipping operations of process block 602, as depicted in FIG. 7. At process block 646, the system compiler selects an internal statement from an internal representation of the source program code that contains a MIN/MAX instruction. Once selected, at process block 648, the system compiler determines whether the selected internal statement matches an arithmetic operation pattern. In one embodiment, this is performed by utilizing the arithmetic operation patterns, as depicted in Table 7.

Once determined, at process block 650, a matching internal statement results in performance of process block 652. Otherwise, control flow branches to process block 646. At process block 652, the selected internal statement is identified within the internal representation of the source program code. In one embodiment, the identification is utilized for subsequent conversion and rewriting of the selected internal statement according to the corresponding rewrite rule, as provided in Table 7. Finally, at process block 654, process blocks 646–654 are repeated for each MIN/MAX internal statement within the internal representation of the source program code.

Figure 12:
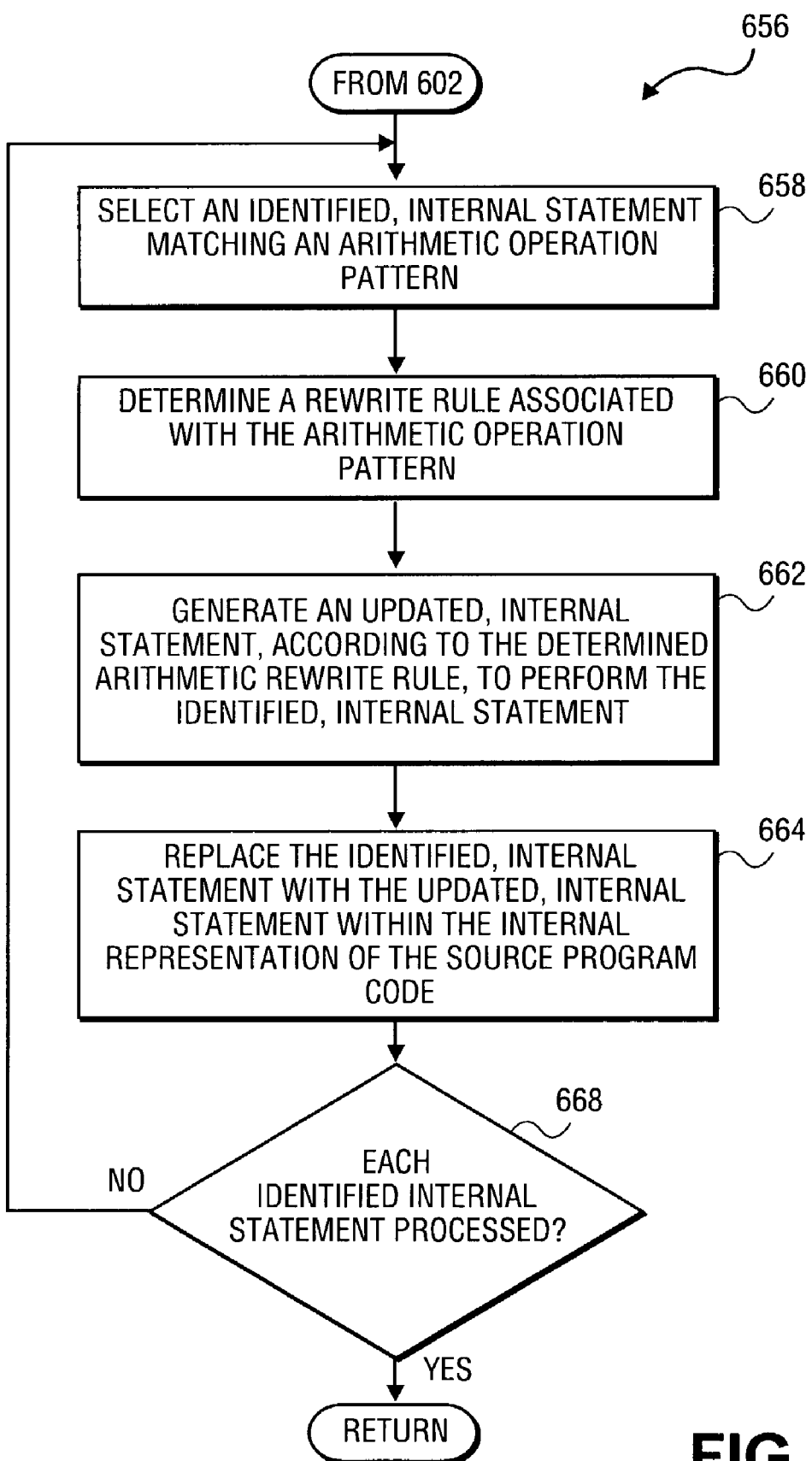
FIG. 12 depicts a flowchart illustrating an additional method for rewriting identified internal conditional statements according to arithmetic rewrite rules, in accordance with a further embodiment of the present invention.

Referring now to FIG. 12, FIG. 12 depicts a flowchart illustrating an additional method 656 for replacing internal MIN/MAX instruction statements with corresponding arithmetic rewrite rules during source program analysis at process block 602, as depicted in FIG. 7. At process block 658, the system compiler selects an identified, internal statement matching an arithmetic operation pattern as determined according to method 644, as depicted in FIG. 11. Once the identified statement is selected, process block 660 is performed.

At process block 660, the arithmetic rewrite rule associated with the matching arithmetic pattern is determined. Once determined, at process block 662, the system compiler generates an updated internal expression according to the arithmetic rewrite rule to perform the identified internal expression. Once generated, at process block 664, the selected internal expression is replaced with the updated internal expression within the internal representation of the source program code. Finally, at process block 668, process blocks 658–664 are repeated for each identified internal expression within the internal representation of the source program code.

Figure 13:
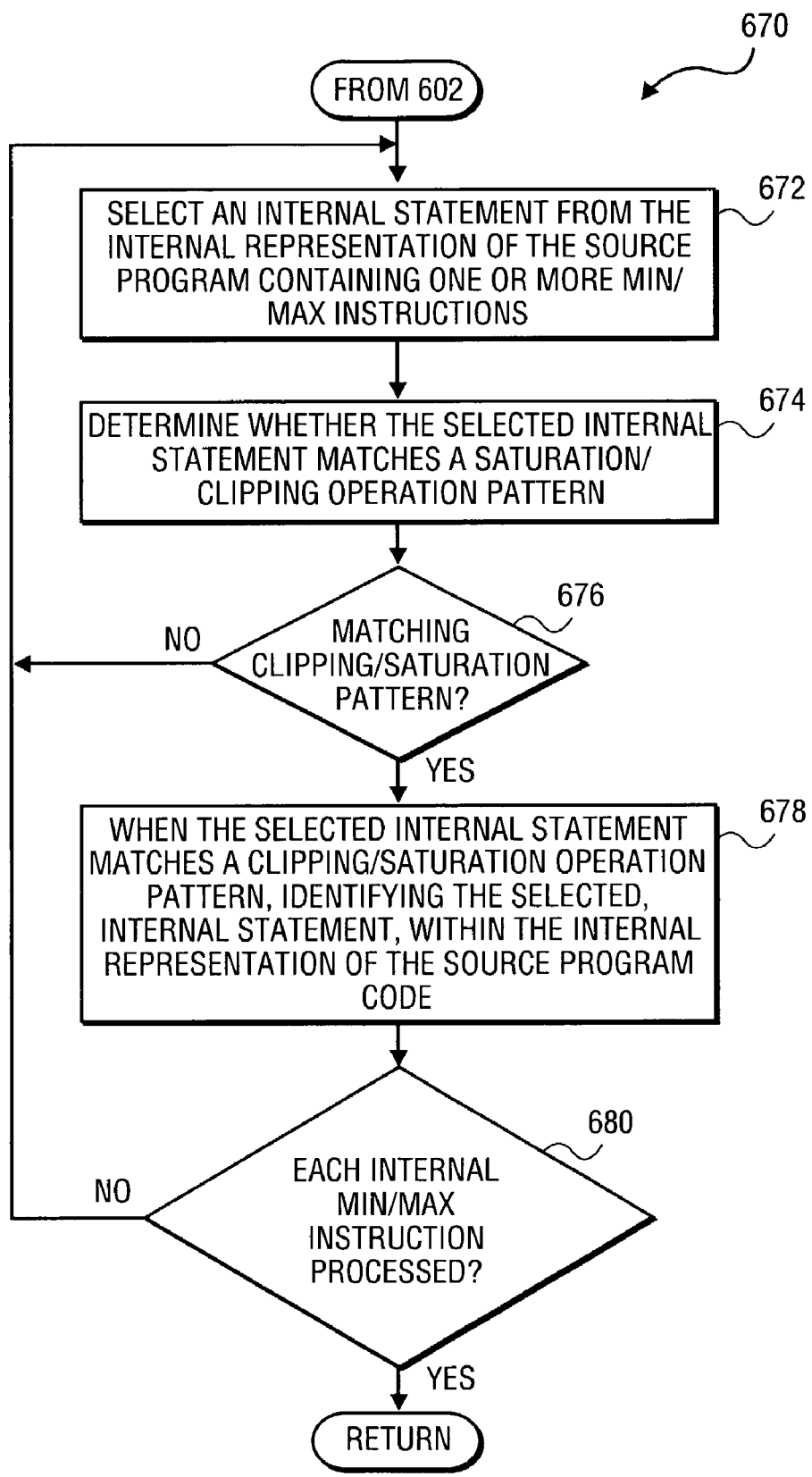
FIG. 13 depicts a flowchart illustrating an additional method for identifying internal statements matching clipping/saturation operation patterns, in accordance with a further embodiment of the present invention.

Referring now to FIG. 13, FIG. 13 depicts a flowchart illustrating an additional method 670 for detecting saturation/clipping operation patterns within internal MIN/MAX instruction statements of the internal representation of the source program code during analysis of the source program at process block 602, as depicted in FIG. 7. At process block 672, the system compiler selects an internal expression from the internal representation of the source program code containing one or more MIN/MAX instructions. Once selected, at process block 674, the system compiler determines whether the selected internal expression matches a saturation/clipping operation pattern, for example, as provided in Tables 10 and 11.

When a matching internal express is selected, process block 678 is performed. Otherwise, control flow branches to process block 672. Accordingly, at process block 678, the selected internal expression is identified within the internal representation of the source program code. In one embodiment, this is performed by marking the selected internal expression within the internal representation of the source program code. Finally, at process block 680, process blocks 672–678 are repeated for each internal MIN/MAX instruction within the internal representation of the source program code.

Figure 14:
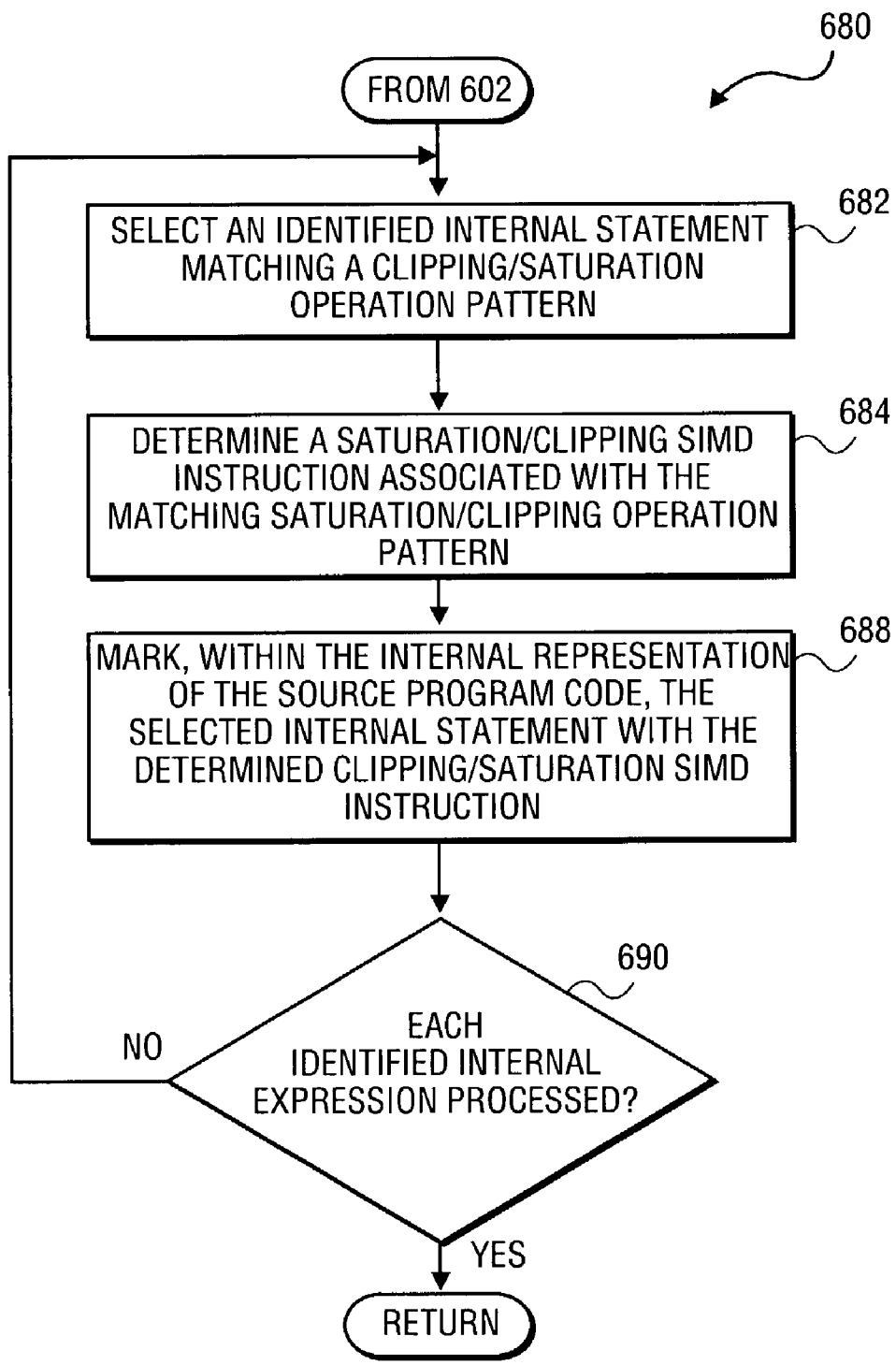
FIG. 14 depicts a flowchart illustrating an additional method for marking internal statements within an internal representation of a source program, with determined clippings/saturation SIMD instructions, in accordance with an exemplary embodiment of the present invention.

Referring now to FIG. 14, FIG. 14 depicts a flowchart illustrating an additional method 680 for marking identified internal MIN/MAX instruction statements within the internal source program representation to enable conversion of marked internal expressions into corresponding SIMD saturation/clipping arithmetic operations. At process block 684, the system compiler selects an identified internal statement matching a clipping/saturation operation pattern, for example, as depicted in Tables 10 and 11.

Next, at process block 686, the system compiler determines a saturation/clipping SIMD instruction associated with the matching saturation/clipping operation pattern. Once determined, at process block 688, the system compiler marks the selected internal expression within the internal representation of the source program code with the determined clipping/saturation SIMD arithmetic instruction. In one embodiment, the marking enables the system compiler to replace the marked internal expression with the corresponding clipping/saturation SIMD arithmetic instruction during SIMD vector code generation. Finally, at process block 690, process blocks 684–688 are repeated for each identified internal statement within the internal representation of the source program code.

Accordingly, once method 680 is complete, analysis of the source program of process block 602 is completed. Consequently, in the embodiment described, the marked internal statements of the internal source program representation will contain a corresponding conditional expression which tests constant values (c) within the marked MIN/MAX instruction statements. Therefore, when the condition is valid, the system compiler will replace the marked internal MIN/MAX operations with corresponding SIMD clipping/saturation arithmetic operation.

Figure 15:
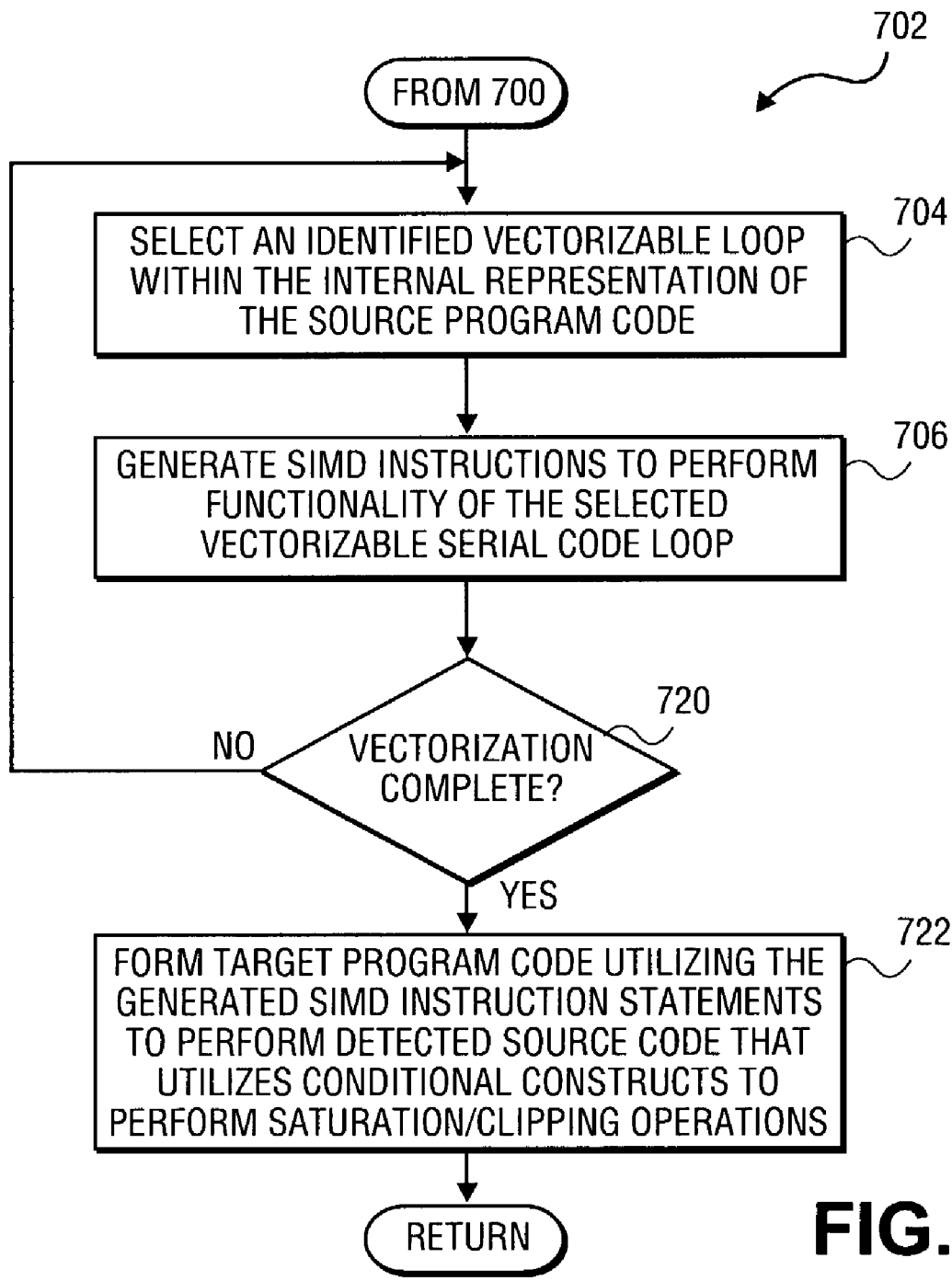
FIG. 15 depicts a flowchart illustrating an additional method for vectorizing identified source code statements to implement saturation/clipping operations using SIMD saturation/clipping instructions, in accordance with a further embodiment of the present invention.

Referring now to FIG. 15, FIG. 15 depicts a flowchart illustrating an additional method 702 for vectorizing identified source code statements implementing saturation/clipping operations utilizing SIMD saturation/clipping arithmetic instructions of process block 700, as depicted in FIG. 7. At process block 704, the system compiler selects an identified vectorizable loop within the internal representation of the source program code. As described above, a vectorizable loop refers to a load loop (including a data store/load instruction) containing serial code statements that may be replaced with corresponding SIMD vector code statements.

Once selected, at process block 706, the system compiler generates SIMD instructions to perform the functionality of selected vectorizable serial code loop. Next, at process block 720, process blocks 704–706 are repeated for each vectorizable serial code loop within the internal representation of the source program code. Consequently, once process block 720 is completed, the system compiler forms a target program executable utilizing generated SIMD instruction statements to perform detected source code utilizing conditional constructs to perform saturation/clipping operations at process block 722.

Figure 16:
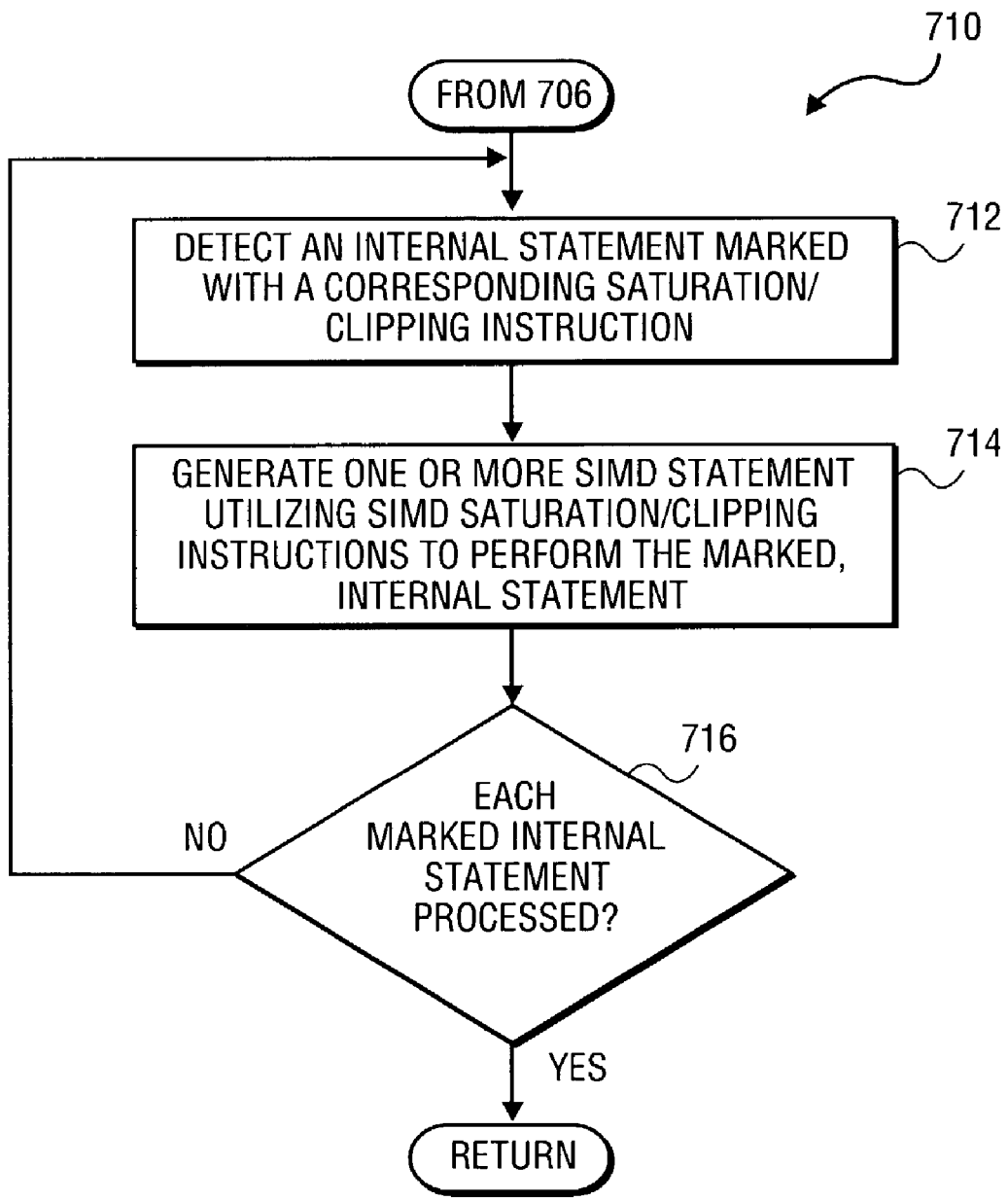
FIG. 16 depicts a flowchart illustrating an additional method for generating SIMD instructions according to internal statements marked with a corresponding saturation/clipping instruction, in accordance with an exemplary embodiment of the present invention.

Finally, referring to FIG. 16, FIG. 16 depicts a flowchart illustrating an additional method 710 for generating SIMD instructions at process block 706, as depicted in FIG. 15. At process block 712, the system compiler detects an internal expression marked with the corresponding saturation/clipping instruction. Once detected, at process block 714, the system compiler generates one or more SIMD saturation/clipping arithmetic instruction statements to perform the marked internal expression, for example, as depicted with reference to Tables 15 and 17. Finally, at process block 716, process blocks 712 and 714 are repeated for each marked internal statement within the internal representation of the source program code.

Accordingly, utilizing the various methods of the embodiments of the present invention, a system compiler is described which is able to detect conditional statements utilized to test the values of various operands prior to performing arithmetic operations in order to avoid conventional wraparound arithmetic. In doing so, the target program generated by the system compiler utilizes SIMD saturation/clipping arithmetic instructions to perform the explicitly coded serial code statements within the source program. As a result, the system compiler reduces the amount of serial code statements within a target program executable generated from the source program. In doing so, efficiency of generated target program code is improved, as indicated by FIGS. 5 and 6, resulting in improvement of almost 37%, as compared to non-vectorization compilers.

Alternate Embodiments

Several aspects of one implementation of the system compiler for providing vectorization of detected saturation/clipping operation patterns have been described. However, various implementations of the system compiler provide numerous features including, complementing, supplementing, and/or replacing the features described above. Features can be implemented as part of a system compiler or as part of the link loader in different embodiment implementations. In addition, the foregoing description, for purposes of explanation, used specific nomenclature to provide a thorough understanding of the embodiments of the invention. However, it will be apparent to one skilled in the art that the specific details are not required in order to practice the embodiments of the invention.

In addition, although an embodiment described herein is directed to a system compiler, it will be appreciated by those skilled in the art that the embodiments of the present invention can be applied to other systems. In fact, systems for detection of expliciting arithmetic operations to enable SIMD vectorization fall within the embodiments of the present invention, as defined by the appended claims. The embodiments described above were chosen and described in order to best explain the principles of the invention and its practical applications. These embodiment were chosen to thereby enable others skilled in the art to best utilize the invention and various embodiments with various modifications as are suited to the particular use contemplated.

It is to be understood that even though numerous characteristics and advantages of various embodiments of the present invention have been set forth in the foregoing description, together with details of the structure and function of various embodiments of the invention, this disclosure is illustrative only. In some cases, certain subassemblies are only described in detail with one such embodiment. Nevertheless, it is recognized and intended that such subassemblies may be used in other embodiments of the invention. Changes may be made in detail, especially matters of structure and management of parts within the principles of the embodiments of the present invention to the full extent indicated by the broad general meaning of the terms in which the appended claims are expressed.

The embodiments of the present invention provides many advantages over known techniques. In one embodiment, the present invention includes the ability to detect explicit code statements utilized to implement saturation/clipping operations. Once detected, embodiments of the present invention describe a methodology for explicitly mapping saturation/clipping code onto efficient SIMD instructions to perform saturation, as well as clipping arithmetic. Accordingly, embodiments of the present invention provide an eloquent methodology to bridge the semantic gap between high level saturation and clipping programming constructs, on the one hand, and low level SIMD instructions, on the other hand. In addition, embodiments of the present invention describe rewriting rules to provide a compact representation for identification of saturation, as well as clipping operations, explicitly coded within a source program. As a result, programmers are spared the task of hand optimizing an application by means of inline assembly or extrinsics to exploit SIMD instructions to perform, for example, saturation arithmetic, as well as clipping operations.

Having disclosed exemplary embodiments and the best mode, modifications and variations may be made to the disclosed embodiments while remaining within the scope of the invention as defined by the following claims.

What is claimed is:

1. A method comprising:
    analyzing, by a compiler, a source program to identify source code utilizing conditional constructs to perform saturation/clipping operations; and
    vectorizing, by the compiler, the identified source code to implement saturation/clipping operations using SIMD saturation/clipping instructions.

2. The method of claim 1, wherein analyzing further comprises:
    generating an internal representation of source code of the source program;
    analyzing internal code statements of the internal representation of the source code to identify internal code statements utilizing conditional constructs to perform MIN/MAX operations; and
    converting, within the internal representation of the source program code, identified internal code statements into internal expressions utilizing MIN/MAX instructions.

3. The method of claim 2, wherein analyzing further comprises:
    selecting, from the internal representation of the source program code, an internal conditional statement;
    determining whether the selected conditional statement matches a MIN/MAX operation pattern;
    when the selected conditional statement matches a MIN/MAX operation pattern, identifying the selected conditional statement within the internal representation of the source program code; and
    repeating the selecting, determining and identifying for each internal conditional statement within the internal representation of the source program code.

4. The method of claim 2, wherein converting further comprises:
    selecting an identified conditional statement matching a MIN/MAX operation pattern;
    determining a MIN/MAX rewrite rule associated with the matching MIN/MAX operation pattern;
    generating an internal expression utilizing one or more MIN/MAX instructions, according to the determined rewrite rule, to perform the selected conditional statement;

replacing, within the internal representation of the source program code, the selected conditional statement with the generated internal expression; and repeating the selecting, determining, generating and replacing for each identified conditional statement within the internal representation of the source program code.

5. The method of claim 1, wherein analyzing further comprises:

selecting, from an internal representation of the source program code, an internal statement containing a MIN/MAX instruction;

determining whether the selected internal statement matches an arithmetic operation pattern;

when the selected internal statement matches an arithmetic operation pattern, identifying the selected internal statement; and repeating the selecting, determining and identifying for each internal statement within the internal representation of the source program code containing a MIN/MAX instruction.

6. The method of claim 1, wherein analyzing further comprises:

selecting an identified, internal statement matching an arithmetic operation pattern;

determining an arithmetic rewrite rule associated with the arithmetic operation pattern;

generating an updated, internal statement, according to the determined arithmetic rewrite rule, to perform the identified internal statement;

replacing, within the internal representation of the source program code, the identified, internal statement with the updated, internal statement; and repeating the selecting, determining, generating and replacing for each identified internal statement within the internal representation of the source program code matching an arithmetic operation pattern.

7. The method of claim 1, wherein analyzing further comprises:

selecting an internal statement from the internal representation of the source program code containing one or more MIN/MAX instructions;

determining whether the selected internal statement matches a saturation/clipping operation pattern;

when the selected, internal statement matches a clipping/saturation operation pattern, identifying the selected, internal statement within the internal representation of the source program code; and repeating the selecting, determining and identifying for each internal statement within the internal representation of the source program code containing one or more MIN/MAX instructions.

8. The method of claim 1, wherein analyzing further comprises:

selecting an identified internal statement matching a clipping/saturation operation pattern;

determining a saturation/clipping SIMD instruction associated with the matching saturation/clipping operation pattern;

marking, within the internal representation of the source program code, the selected internal statement with the determined clipping/saturation SIMD instruction; and repeating the selecting, determining and marking for each identified internal statement within the internal representation of the source program code.

9. The method of claim 1, wherein vectorizing further comprises:

selecting an identified vectorizable loop within the internal representation of the source program code;

generating SIMD instructions to perform functionality of the selected vectorizable serial code loop;

repeating the selecting and generating for each vectorizable serial code loop within the internal representation of the source program code; and forming target program code utilizing generated SIMD instruction statements to perform detected source code utilizing conditional constructs to perform saturation/clipping clipping operations.

10. The method of claim 9, wherein generating further comprises:

detecting an internal statement marked with a corresponding saturation/clipping instruction; and generating one or more SIMD statement utilizing SIMD saturation/clipping instructions to perform the marked, internal statement; and repeating the detecting and generation for each marked internal statement within the internal representation of the source program code.

11. A computer readable storage medium including program instructions that direct a computer to perform one or more operations of a compiler when executed by a processor, the one or more operations of the compiler comprising:

analyzing a source program to identify source code utilizing conditional constructs to perform saturation/clipping operations; and vectorizing identified source code to implement saturation/clipping operations using SIMD saturation/clipping instructions.

12. The computer readable storage medium of claim 11, wherein analyzing further comprises:

generating an internal representation of source code of the source program;

analyzing internal code statements of the internal representation of the source code to identify internal code statements utilizing conditional constructs to perform MIN/MAX operations; and converting, within the internal representation of the source program code, identified internal code statements into internal expressions utilizing MIN/MAX instructions.

13. The computer readable storage medium of claim 12, wherein analyzing further comprising:

selecting, from the internal representation of the source program code, an internal conditional statement;

determining whether the selected conditional statement matches a MIN/MAX operation pattern;

when the selected conditional statement matches a MIN/MAX operation pattern, identifying the selected conditional statement within the internal representation of the source program code; and repeating the selecting, determining and identifying for each internal conditional statement within the internal representation of the source program code.

14. The computer readable storage medium of claim 12, wherein converting further comprises:

selecting an identified conditional statement matching a MIN/MAX operation pattern;

determining a MIN/MAX rewrite rule associated with the matching MIN/MAX operation pattern;

generating an internal expression utilizing one or more MIN/MAX instructions, according to the determined rewrite rule, to perform the selected conditional statement;

replacing, within the internal representation of the source program code, the selected conditional statement with the generated internal expression; and repeating the selecting, determining, generating and replacing for each identified conditional statement within the internal representation of the source program code.

15. The computer readable storage medium of claim 11, wherein analyzing further comprises:

selecting, from an internal representation of the source program code, an internal statement containing a MIN/MAX instruction;

determining whether the selected internal statement matches an arithmetic operation pattern;

when the selected internal statement matches an arithmetic operation pattern, identifying the selected internal statement; and repeating the selecting, determining and identifying for each internal statement within the internal representation of the source program code containing a MIN/MAX instruction.

16. The computer readable storage medium of claim 11, wherein analyzing further comprises:

selecting an identified, internal statement matching an arithmetic operation pattern;

determining an arithmetic rewrite rule associated with the arithmetic operation pattern;

generating an updated, internal statement, according to the determined arithmetic rewrite rule, to perform the identified internal statement;

replacing, within the internal representation of the source program code, the identified, internal statement with the updated, internal statement; and repeating the selecting, determining, generating and replacing for each identified internal statement within the internal representation of the source program code matching an arithmetic operation pattern.

17. The computer readable storage medium of claim 11, wherein analyzing further comprises:

selecting an internal statement from the internal representation of the source program code containing one or more MIN/MAX instructions;

determining whether the selected, internal expression matches a saturation/clipping operation pattern;

when the selected, internal statement matches a clipping/saturation operation pattern, identifying the selected, internal statement within the internal representation of the source program code; and repeating the selecting, determining and identifying for each internal statement within the internal representation of the source program code containing one or more MIN/MAX instructions.

18. The computer readable storage medium of claim 11, wherein analyzing further comprises:

selecting an identified internal statement matching a clipping/saturation operation pattern;

determining a saturation/clipping SIMD instruction associated with the matching saturation/clipping operation pattern;

marking, within the internal representation of the source program code, the selected internal statement with the determined clipping/saturation SIMD instruction; and repeating the selecting, determining and marking for each identified internal statement within the internal representation of the source program code.

19. The computer readable storage medium of claim 11, wherein vectorizing further comprises:

selecting an identified vectorizable loop within the internal representation of the source program code;

generating SIMD instructions to perform functionality of the selected vectorizable serial code loop;

repeating the selecting and generating for each vectorizable serial code loop within the internal representation of the source program code; and forming target program code utilizing generated SIMD instruction statements to perform detected source code utilizing conditional constructs to perform saturation/clipping clipping operations.

20. The computer readable storage medium of claim 19, wherein generating further comprises:

detecting an internal statement marked with a corresponding saturation/clipping instruction; and generating one or more SIMD statement utilizing SIMD saturation/clipping instructions to perform the marked, internal statement; and repeating the detecting and generation for each marked internal statement within the internal representation of the source program code.

21. A system, comprising:

a processor having circuitry to execute instructions;

a communications interface coupled to the processor, the communications interface to receive a source program, and to provide an optimized target program executable once the source program is compiled; and a storage device coupled to the processor, having sequences of instructions stored therein, which when executed by the processor cause the processor to load a compiler, the compiler to:

analyze a source program to identify source code utilizing conditional constructs to perform saturation/clipping operations, and vectorize identified source code to implement saturation/clipping operations using SIMD saturation/clipping instructions.

22. The system of claim 21, wherein the operation to analyze further causes the compiler to:

generate an internal representation of source code of the source program;

analyze internal code statements of the internal representation of the source code to identify internal code statements utilizing conditional constructs to perform MIN/MAX operations; and convert, within the internal representation of the source program code, identified internal code statements into internal expressions utilizing MIN/MAX instructions.

23. The system of claim 22, wherein the operation to analyze further causes the compiler to:

select, from the internal representation of the source program code, an internal conditional statement;

determine whether the selected conditional statement matches a MIN/MAX operation pattern;

when the selected conditional statement matches a MIN/MAX operation pattern, identify the selected conditional statement within the internal representation of the source program code, and repeat the select, determine and identify for each internal conditional statement within the internal representation of the source program code.

24. The system of claim 22, wherein the operation to convert further causes the compiler to:
   select an identified conditional statement matching a MIN/MAX operation pattern;
   determine a MIN/MAX rewrite rule associated with the matching MIN/MAX operation pattern;
   generate an internal expression utilizing one or more MIN/MAX instructions, according to the determined rewrite rule, to perform the selected conditional statement;
   replace, within the internal representation of the source program code, the selected conditional statement with the generated internal expression; and
   repeat the select, determine, generate and replace for each identified conditional statement within the internal representation of the source program code.

25. The system of claim 21, wherein the operation to analyze further causes the compiler to:
   select, from an internal representation of the source program code, an internal statement containing a MIN/MAX instruction;
   determine whether the selected internal statement matches an arithmetic operation pattern;
   when the selected internal statement matches an arithmetic operation pattern, identify the selected internal statement; and
   repeat the select, determine and identify for each internal statement within the internal representation of the source program code containing a MIN/MAX instruction.

26. The system of claim 21, wherein the operation to analyze further causes the compiler to:
   select an identified, internal statement matching an arithmetic operation pattern;
   determine an arithmetic rewrite rule associated with the arithmetic operation pattern;
   generate an updated, internal statement, according to the determined arithmetic rewrite rule, to perform the identified internal statement;
   replace, within the internal representation of the source program code, the identified, internal statement with the updated, internal statement; and
   repeat the select, determine, generate and replace for each identified internal statement within the internal representation of the source program code matching an arithmetic operation pattern.

27. The system of claim 21, wherein the operation to analyze further causes the compiler to:
   select an internal statement from the internal representation of the source program code containing one or more MIN/MAX instructions;
   determine whether the selected internal statement matches a saturation/clipping operation pattern;
   when the selected, internal statement matches a clipping/saturation operation pattern, identify the selected, internal statement within the internal representation of the source program code; and
   repeat the select, determine and identify for each internal statement within the internal representation of the source program code containing one or more MIN/MAX instructions.

28. The system of claim 21, wherein the operation to analyze further causes the compiler to:
   select an identified internal statement matching a clipping/saturation operation pattern;
   determine a saturation/clipping SIMD instruction associated with the matching saturation/clipping operation pattern;
   mark, within the internal representation of the source program code, the selected internal statement with the determined clipping/saturation SIMD instruction; and
   repeat the select, determine and mark for each identified internal statement within the internal representation of the source program code.

29. The system of claim 21, wherein the operation to vectorize further causes the compiler to:
   select an identified vectorizable loop within the internal representation of the source program code;
   generate SIMD instructions to perform functionality of the selected vectorizable serial code loop;
   repeat the select and generate for each vectorizable serial code loop within the internal representation of the source program code; and
   form target program code utilizing generated SIMD instruction statements to perform detected source code utilizing conditional constructs to perform saturation/clipping clipping operations.

30. The system of claim 21, wherein the operation to generate further causes the compiler to:
   detect an internal statement marked with a corresponding saturation/clipping instruction; and
   generate one or more SIMD statement utilizing SIMD saturation/clipping instructions to perform the marked, internal statement; and
   repeat the detect and generate for each marked internal statement within the internal representation of the source program code.

* * * * *

UNITED STATES PATENT AND TRADEMARK OFFICE
CERTIFICATE OF CORRECTION

PATENT NO. : 7,020,873 B2  Page 1 of 1
APPLICATION NO. : 10/176503
DATED : March 28, 2006
INVENTOR(S) : Aart J. C. Bik et al.

It is certified that error appears in the above-identified patent and that said Letters Patent is hereby corrected as shown below:

| | |
|---|---|
| Column 7, Line 45 | Delete "STMD" and insert -- SIMD -- |
| Column 10, Line 20 | Delete "floating-pint" and insert -- floating point -- |
| Column 11, Line 27 | Insert -- to -- after "order" |
| Column 12, Line 65 | Insert -- < -- before "$=_s$" |
| Column 14, Line 30 | Delete "$(x_{s32}, c)$" and insert -- $(x_{u32}, c)$ -- |
| Column 17, Line 63 | Delete "$MINS_s$" and insert -- $MIN_s$ -- |
| Column 17, Line 64 | Delete "$MAXS_s$" and insert -- $MAX_s$ -- |
| Column 23, Line 50 | Delete "embodiment" and insert -- embodiments -- |
| Column 26, Line 13 | Delete second occurrence of "clipping" |
| Column 26, Line 49 | Delete "comprising" and insert -- comprises -- |
| Column 28, Line 16 | Delete second occurrence of "clipping" |
| Column 30, Line 38 | Delete second occurrence of "clipping" |

Signed and Sealed this

Tenth Day of June, 2008

JON W. DUDAS
*Director of the United States Patent and Trademark Office*